US011363240B2

(12) United States Patent
Valli

(10) Patent No.: US 11,363,240 B2
(45) Date of Patent: Jun. 14, 2022

(54) SYSTEM AND METHOD FOR AUGMENTED REALITY MULTI-VIEW TELEPRESENCE

(71) Applicant: PCMS Holdings, Inc., Wilmington, DE (US)

(72) Inventor: Seppo T. Valli, Espoo (FI)

(73) Assignee: PCMS HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/894,603

(22) Filed: Jun. 5, 2020

(65) Prior Publication Data

US 2020/0304758 A1 Sep. 24, 2020

Related U.S. Application Data

(63) Continuation of application No. 15/752,239, filed as application No. PCT/US2016/046848 on Aug. 12, 2016, now Pat. No. 10,701,318.

(Continued)

(51) Int. Cl.
*H04N 13/243* (2018.01)
*H04N 7/15* (2006.01)
(Continued)

(52) U.S. Cl.
CPC ........... *H04N 7/157* (2013.01); *G02B 27/017* (2013.01); *G06T 19/006* (2013.01);
(Continued)

(58) Field of Classification Search
CPC ..... G02B 27/017; G06F 3/017; G06T 19/006; G06T 15/005; H04N 7/147; H04N 7/157;
(Continued)

(56) References Cited

U.S. PATENT DOCUMENTS 4,400,724 A 8/1983 Fields
5,182,641 A 1/1993 Diner
(Continued)

FOREIGN PATENT DOCUMENTS

CN 1703065 A 11/2005
CN 1719852 A 1/2006
(Continued)

OTHER PUBLICATIONS

International Search Report and Written Opinion of the International Searching Authority for PCT/US2017/038820 dated Nov. 7, 2017.
(Continued)

*Primary Examiner* — Gerald Gauthier
(74) *Attorney, Agent, or Firm* — Invention Mine LLC

(57) ABSTRACT

Disclosed herein are systems and methods for augmented reality multi-view telepresence. An embodiment takes the form of a method that includes obtaining a session geometry of a multi-location telepresence session that includes a first-location participant at a first location and a second-location participant at a second location, each location having respective pluralities of cameras and display segments. The method includes selecting, according to the session geometry, both a first-to-second-viewpoint second-location camera from the plurality of second-location cameras as well as a first-to-second-viewpoint first-location display segment from the plurality of first-location display segments. The method includes receiving a first-to-second-viewpoint video stream captured by the selected first-to-second-viewpoint second-location camera, and further includes generating a line-of-sight augmented-reality experience for the multi-location telepresence session at least in part by rendering the received first-to-second-viewpoint (Continued)

video stream via the selected first-to-second-viewpoint first-location display segment.

20 Claims, 23 Drawing Sheets

Related U.S. Application Data

(60) Provisional application No. 62/205,487, filed on Aug. 14, 2015.

(51) Int. Cl.
| | |
|---|---|
| *G02B 27/01* | (2006.01) |
| *G06T 19/00* | (2011.01) |
| *H04S 7/00* | (2006.01) |
| *H04R 27/00* | (2006.01) |

(52) U.S. Cl.
CPC ........... *H04N 13/243* (2018.05); *H04S 7/303* (2013.01); *H04R 27/00* (2013.01); *H04S 2400/11* (2013.01); *H04S 2400/15* (2013.01)

(58) Field of Classification Search
CPC .... H04N 13/243; H04N 21/816; H04R 27/00; H04S 7/303; H04S 2400/11; H04S 2400/15; A61F 2/4611
USPC ........... 345/420, 426, 633; 348/14.07, 14.08, 348/14.09, 14.1, 157; 463/25; 715/723; 386/231; 606/130; 701/28
See application file for complete search history.

(56) References Cited

U.S. PATENT DOCUMENTS

| | | | |
|---|---|---|---|
| 5,495,576 A * | 2/1996 | Ritchey | H04N 13/194 345/420 |
| 6,259,470 B1 * | 7/2001 | Koizumi | G06T 15/10 348/14.01 |
| 6,577,333 B2 | 6/2003 | Tai | |
| 6,853,398 B2 * | 2/2005 | Malzbender | A63F 13/12 348/14.09 |
| 7,096,428 B2 | 8/2006 | Foote | |
| 7,298,392 B2 | 11/2007 | Cutler | |
| 7,319,980 B2 | 1/2008 | Kronenberger | |
| 7,515,174 B1 | 4/2009 | Francisco | |
| 7,796,155 B1 * | 9/2010 | Neely, III | G06T 19/006 348/157 |
| 7,808,540 B2 | 10/2010 | Cok | |
| 7,840,638 B2 | 11/2010 | Zhang | |
| 7,865,834 B1 | 1/2011 | Van Os | |
| 8,134,556 B2 * | 3/2012 | Elsberg | G06T 15/405 345/426 |
| 8,212,872 B2 | 7/2012 | Sablak | |
| 8,310,519 B2 | 11/2012 | Valenzuela | |
| 8,358,328 B2 * | 1/2013 | Friel | H04N 7/15 348/14.08 |
| 8,471,889 B1 | 6/2013 | Lee | |
| 8,587,583 B2 | 11/2013 | Newcombe | |
| 8,675,067 B2 | 3/2014 | Chou | |
| 8,717,417 B2 | 5/2014 | Sali | |
| 8,786,675 B2 | 7/2014 | Deering | |
| 8,797,377 B2 * | 8/2014 | Mauchly | H04N 7/144 348/14.08 |
| 8,872,817 B2 | 10/2014 | Kim | |
| 8,908,008 B2 | 12/2014 | Tan | |
| 8,957,940 B2 | 2/2015 | Tian | |
| 8,976,224 B2 | 3/2015 | Smith | |
| 9,070,216 B2 | 6/2015 | Golparvar-Fard | |
| 9,268,406 B2 * | 2/2016 | Geisner | G02B 27/017 |
| 9,270,941 B1 * | 2/2016 | Lavelle | H04N 7/147 |
| 9,275,499 B2 | 3/2016 | Adhikari | |
| 9,300,916 B1 | 3/2016 | Breedvelt-Schouten | |
| 9,325,939 B2 | 4/2016 | Schultz | |
| 9,332,218 B2 | 5/2016 | Smith | |
| 9,332,222 B2 | 5/2016 | Smith | |
| 9,363,476 B2 | 6/2016 | Fish | |
| 9,836,870 B2 | 12/2017 | Smith | |
| 9,866,699 B2 | 1/2018 | Kleiner | |
| 9,896,206 B2 | 2/2018 | Potter | |
| 9,984,495 B2 | 5/2018 | Gharpure | |
| 9,986,206 B2 | 5/2018 | Fish | |
| 10,425,570 B2 | 9/2019 | Van Hoff | |
| 10,701,318 B2 * | 6/2020 | Valli | H04S 7/303 |
| 10,719,192 B1 | 7/2020 | Cabanero | |
| 2002/0010734 A1 | 1/2002 | Ebersole | |
| 2002/0080094 A1 | 6/2002 | Biocca | |
| 2003/0067536 A1 | 4/2003 | Boulanger | |
| 2003/0234859 A1 | 12/2003 | Malzbender | |
| 2005/0140779 A1 | 6/2005 | Schulz | |
| 2005/0168402 A1 | 8/2005 | Culbertson | |
| 2005/0262201 A1 | 11/2005 | Rudolph | |
| 2005/0265535 A1 | 12/2005 | Kanada | |
| 2005/0286101 A1 | 12/2005 | Garner | |
| 2006/0008117 A1 | 1/2006 | Kanada | |
| 2006/0104458 A1 | 5/2006 | Kenoyer | |
| 2007/0279484 A1 | 12/2007 | Derocher | |
| 2008/0031608 A1 | 2/2008 | Gorzynski | |
| 2008/0158340 A1 | 7/2008 | Shibata | |
| 2008/0215204 A1 * | 9/2008 | Roy | H04B 7/18504 701/28 |
| 2008/0243142 A1 * | 10/2008 | Gildenberg | A61B 90/36 606/130 |
| 2009/0165000 A1 | 6/2009 | Gyorfi | |
| 2009/0207233 A1 | 8/2009 | Mauchly | |
| 2009/0244257 A1 | 10/2009 | Macdonald | |
| 2010/0085416 A1 | 4/2010 | Hegde | |
| 2010/0103244 A1 | 4/2010 | Brandsma | |
| 2010/0115411 A1 * | 5/2010 | Sorokin | H04N 5/2627 715/723 |
| 2010/0149337 A1 * | 6/2010 | Porcino | H04N 5/23203 348/E7.086 |
| 2010/0159430 A1 | 6/2010 | Lee | |
| 2010/0171808 A1 | 7/2010 | Harrell | |
| 2010/0257464 A1 | 10/2010 | Renner | |
| 2010/0259595 A1 | 10/2010 | Trimeche | |
| 2011/0025819 A1 | 2/2011 | Gorzynski | |
| 2011/0032324 A1 | 2/2011 | George | |
| 2011/0065496 A1 * | 3/2011 | Gagner | G07F 17/3211 463/25 |
| 2011/0102538 A1 * | 5/2011 | Tan | H04N 21/4223 348/14.08 |
| 2011/0316963 A1 * | 12/2011 | Li | H04N 13/243 348/46 |
| 2012/0033030 A1 | 2/2012 | Liu | |
| 2012/0050458 A1 | 3/2012 | Mauchly | |
| 2012/0098965 A1 | 4/2012 | Barcala | |
| 2012/0154510 A1 | 6/2012 | Huitema | |
| 2012/0176467 A1 | 7/2012 | Kenoyer | |
| 2012/0200658 A1 | 8/2012 | Duckworth | |
| 2012/0281059 A1 | 11/2012 | Chou | |
| 2013/0076853 A1 | 3/2013 | Diao | |
| 2013/0088489 A1 | 4/2013 | Schmeitz et al. | |
| 2013/0109961 A1 | 5/2013 | Bose | |
| 2013/0117377 A1 | 5/2013 | Miller | |
| 2013/0141573 A1 | 6/2013 | Sutter | |
| 2013/0155106 A1 * | 6/2013 | Rolleston | G06T 19/006 345/633 |
| 2013/0198629 A1 | 8/2013 | Tandon | |
| 2013/0249947 A1 | 9/2013 | Reitan | |
| 2013/0258036 A1 * | 10/2013 | Tong | H04N 7/157 348/14.1 |
| 2013/0265382 A1 | 10/2013 | Guleryuz | |
| 2013/0278631 A1 | 10/2013 | Border | |
| 2013/0300820 A1 | 11/2013 | Liu | |
| 2013/0321564 A1 | 12/2013 | Smith | |
| 2013/0321593 A1 | 12/2013 | Kirk | |
| 2014/0098183 A1 | 4/2014 | Smith | |
| 2014/0104368 A1 | 4/2014 | Tan | |
| 2014/0139610 A1 | 5/2014 | Weber | |
| 2014/0146127 A1 | 5/2014 | He | |

(56) References Cited

U.S. PATENT DOCUMENTS

| | | | |
|---|---|---|---|
| 2014/0225978 A1* | 8/2014 | Saban | G09F 19/16 |
| | | | 348/14.07 |
| 2014/0232816 A1 | 8/2014 | Wilson | |
| 2014/0240444 A1* | 8/2014 | Szymczyk | H04N 7/157 |
| | | | 348/14.07 |
| 2014/0247212 A1 | 9/2014 | Kim | |
| 2014/0267584 A1 | 9/2014 | Atzpadin | |
| 2014/0270302 A1 | 9/2014 | Pocino | |
| 2014/0320529 A1 | 10/2014 | Roberts | |
| 2015/0016777 A1 | 1/2015 | Abovitz | |
| 2015/0055929 A1 | 2/2015 | Van Hoff | |
| 2015/0078582 A1 | 3/2015 | Graham | |
| 2015/0091891 A1 | 4/2015 | Raheman | |
| 2015/0098690 A1* | 4/2015 | Abbate | G11B 27/031 |
| | | | 386/231 |
| 2015/0186728 A1* | 7/2015 | Kimura | G06K 9/00671 |
| | | | 345/633 |
| 2015/0213650 A1 | 7/2015 | Barzuza | |
| 2015/0215351 A1 | 7/2015 | Barzuza | |
| 2015/0215581 A1* | 7/2015 | Barzuza | H04L 12/18 |
| | | | 348/14.1 |
| 2015/0281649 A1 | 10/2015 | Ehmann | |
| 2015/0312294 A1 | 10/2015 | Olsen | |
| 2015/0373303 A1 | 12/2015 | Visosky | |
| 2016/0027218 A1 | 1/2016 | Salter | |
| 2016/0050391 A1 | 2/2016 | Schultz | |
| 2016/0065864 A1 | 3/2016 | Guissin | |
| 2016/0148433 A1 | 5/2016 | Petrovskaya | |
| 2016/0173823 A1 | 6/2016 | Duckworth | |
| 2016/0307371 A1* | 10/2016 | Ayers | G11B 27/19 |
| 2016/0353056 A1 | 12/2016 | Cullen | |
| 2016/0353058 A1 | 12/2016 | Caviedes | |
| 2017/0019632 A1 | 1/2017 | Lad | |
| 2017/0124764 A1 | 5/2017 | Akselrod | |
| 2017/0127023 A1 | 5/2017 | High | |
| 2017/0200317 A1 | 7/2017 | Hannemann | |
| 2017/0339372 A1* | 11/2017 | Valli | H04N 7/157 |
| 2018/0108172 A1 | 4/2018 | Huston | |
| 2019/0042832 A1 | 2/2019 | Venshtain | |
| 2019/0253667 A1* | 8/2019 | Valli | G02B 27/017 |
| 2020/0304758 A1* | 9/2020 | Valli | G06T 19/006 |
| 2021/0303251 A1* | 9/2021 | Fujimaki | H04N 21/4122 |
| 2021/0330477 A1* | 10/2021 | Kim | A61B 34/20 |

FOREIGN PATENT DOCUMENTS

| | | |
|---|---|---|
| CN | 102999585 A | 3/2013 |
| CN | 104782122 A | 7/2015 |
| CN | 104871213 A | 8/2015 |
| CN | 105872444 A | 8/2016 |
| CN | 106165404 A | 11/2016 |
| CN | 106447786 A | 2/2017 |
| CN | 106548517 | 3/2017 |
| CN | 106648071 A | 5/2017 |
| CN | 106662925 A | 5/2017 |
| EP | 2400464 A2 | 12/2011 |
| EP | 2400646 A2 | 12/2011 |
| EP | 2953351 A1 | 12/2015 |
| WO | 2008101117 A1 | 8/2008 |
| WO | 2009036782 A1 | 3/2009 |
| WO | 2012059279 A1 | 5/2012 |
| WO | 2015039239 A1 | 3/2015 |
| WO | 2016077180 A1 | 5/2016 |
| WO | 2017030985 A1 | 2/2017 |

OTHER PUBLICATIONS

International Search Report and Written Opinion of the International Searching Authority for PCT/US2017/047605 dated Oct. 27, 2017.
International Preliminary Report on Patentability for PCT/US2016/046848 dated Mar. 1, 2018.
Nguyen, David, et al., "MultiView: Spatially Faithful Group Video Conferencing". Proceedings of the 2005 Conference on Human Factors in Computing Systems (CHI'05) Apr. 2-7, 2005.
Written Opinion of the International Preliminary Examining Authority for PCT/US2017/038820, dated May 30, 2018.
International Search Report and Written Opinion of the International Searching Authority for PCT/US2018/035435 dated Sep. 10, 2018.
International Preliminary Report on Patentability for PCT/US2017/038820 completed on Sep. 12, 2018.
Maimone, Andrew, et al., "Real-Time Volumetric 3D Capture of Room-Sized Scenes for Telepresence", 3DTV Conference: The True Vision—Capture, Transmission and Display of 3D Video, 3DTV-CON 2012, Zurich, Switzerland, Oct. 15-17, 2012.
Zhang, Cha, et. al.,"Viewport: A Distributed, Immersive Teleconferencing System with Infrared Dot Pattern". IEEE Multimedia, vol. 20, No. 1, Jan.-Mar. 2013, pp. 17-27.
Fuchs, Henry, et. al., "Virtual Space Teleconferencing using a Sea of Cameras" Leonard McMillan University of North Carolina at Chapel Hill, (1994).
Nguyen, David, "MultiView: Spatially Faithful Group Video Conferencing", Mar. 23, 2005.
Feldmann, I. et al., "Immersive Multi-User 3D Video Communication" (2009).
Yang, Ruigang, et al. "Creating Adaptive Views for Group Video Teleconferencing—An Image-Based Approach". Copyright (2002) ACM 1-58113-640-4/02/12, 4 pages.
Kato, Hirokazu, et. al., "Marker Tracking and HMD Calibration for a Video-based Augmented Reality Conferencing System" Oct. 1999.
Yang, Ruigang, et. al, "Interactive 3D Teleconferencing with User-adaptive Views". ETP '04, Oct. 15, 2004, ACM 1-58113-933-0/04/0010.
Fuchs, Henry, et. al, "Group Tele-Immersion". Department of Energy ASC Views Program, University of Kentucy, last updated May 1, 2005.
Billinghurst, Mark, et. al. "Collaborative Augmented Reality". Communications of the ACM, Jul. 2002, vol. 45 No. 7, 8 pages.
Kantonen, Tuomas, et. al., "Mixed Reality in Virtual World Teleconferencing", IEEE, Virtual Reality Mar. 20-24, 2010, 978-1-4244-6236-0/10. Available at: http://virtual.vtt.fi/virtual/proj2/multimedia/media/publications/kantonen-2010.pdf.
Regenbrecht, Holger, et. al., "An Augmented Virtuality Approach to 3D Videoconferencing". Proceedings of the Second IEEE and ACM International Symposium on Mixed and Augmented Reality (ISMAR '03) 0-7695-2006-5/03, (2003), IEEE, pp. 1-2.
Yang, Jason, et al., "A Real-Time Distributed Light Field Camera". Eurographics Workshop on Rendering, (2002), 10 pages.
Nguyen, David, et. al. "MultiView: Improving Trust in Group Video Conferencing Through Spatial Faithfulness". CHI 2007, Apr. 28-May 3, 2007, ACM 978-1-59593-593-9/07/0004, 10 pages.
Avrahami, Daniel, et. al., "Supporting Multitasking in Video Conferencing using Gaze Tracking and On-Screen Activity Detection". Proceedings of the 21st International Conference on Intelligent User Interfaces, Mar. 7-10, 2016. ACM 978-1-4503-4137-0/16/03, 5 pages.
Siltanen, Pekka, et. al., "An Architecture for Remote Guidance Service". VTT Technical Research Centre, (2015), pp. 288-297.
Lanier, Jaron, "Virtually There". Scientific American, Apr. 2001, 16 pages.
Buxton, William, "Telepresence: integrating shared task and person spaces". Proceedings of Graphics Interface '92, (1992), pp. 123-129.
Vertegaal, Roelm "The GAZE Groupware System: Mediating Joint Attention in Multiparty Communication and Collaboration". In Proceedings of CHI'99, Conference on Human Factors in Computing Systems, (1999), 8 pages.
Kristoffersson, Annica, et. al., "A Review of Mobile Robotic Telepresence". Hindawi Publishing Corporation Advances in Human-Computer Interaction vol. 2013, (2013), pp. 1-17.
Moons, Theo, et. al., "3D Reconstruction from Multiple Images Part 1: Principles", Foundations and Trends in Computer Graphics and Vision, vol. 4, No. 4, (2008), 37 pages.

(56) References Cited

OTHER PUBLICATIONS

Baričević, Domagoj, et. al., "A Hand-Held AR Magic Lens with User-Perspective Rendering". IEEE International Symposium on Mixed and Augmented Reality (ISMAR), (2012), 10 pages.
Dou, Mingsong, et. al., "Room-sized Informal Telepresence System". IEEE Virtual Reality, (2012), pp. 15-18.
Zomet, Assaf, et. al., "Mosaicing New Views: The Crossed-Slits Projection". IEEE Transactions on Pattern Analysis and Machine Intelligence, vol. 25, No. 6, Jun. 2003, pp. 741-754.
Tola, Engin, et. al., "Virtual View Generation with a Hybrid Camera Array". CVLAB-REPORT-2009-001, EPFL, (2009), 20 pages.
Kimber, Don, et. al., "FlyAbout: Spatially Indexed Panoramic Video". Proceedings of The Ninth ACM International Conference on Multimedia, Oct. 2001, 10 pages.
Kurashima, Celso., et. al. "Combining Approximate Geometry with View-Dependent Texture Mapping—A Hybrid Approach to 3D Video Teleconferencing" Proceedings. XV Brazilian Symposium on Computer Graphics and Image Processing, (2002).
U.S. Appl. No. 62/357,060, filed Jun. 30, 2016.
International Search Report and Written Opinion of the International Searching Authority for PCT/US2016/046848, dated Nov. 9, 2016, 12 pages.
Kannala, Juho, et. al. "A Generic Camera Model and Calibration Method for Conventional, Wide-Angle and Fish-Eye Lenses". IEEE Transactions on Pattern Analysis and Machine Intelligence, vol. 28, No. 8, Aug. 2006, 15 pages.
Scaramuzza, Davide, et. al., "Visual Odometry: Part I—The First 30 Years and Fundamentals". IEEE Robotics and Automation Magazine, vol. 18, No. 4, Dec. 2011, 13 pages.
Fraundorfer, Friedrich, et. al. "Visual Odometry: Part II—Matching, Robustness, and Applications". IEEE Robotics and Automation Magazine, vol. 19, No. 2, Jun. 2012, 13 pages.
Xu, Yang, et. al., "Video Telephony for End-consumers: Measurement Study of Google+, iChat, and Skype". In Proceedings of the 2012 ACM conference on Internet measurement conference, Nov. 2012, pp. 371-384.
Hirsch, Matthew, et. al., "BiDi Screen: A Thin, Depth-Sensing LCD for 3D Interaction using Light Fields", with appendix. ACM Transactions on Graphics (ToG), vol. 28, No. 5, (2009), 10 pages.
Bannò, Filippo, et. al., "Real-Time Compression of Depth Streams through Meshification and Valence-Based Encoding". Proceedings of the 11th ACM SIGGRAPH International Conference on Virtual-Reality Continuum and Its Applications in Industry, Dec. 2012, 8 pages.
Chen, Ying, et. al., "Next-Generation 3D Formats with Depth Map Support". In IEEE MultiMedia, vol. 21, No. 2, Apr. 2014, 5 pages.
Alexiadis, Dimitrios, S., et. al., "Real-Time, Full 3-D Reconstruction of Moving Foreground Objects from Multiple Consumer Depth Cameras". IEEE Transactions on Multimedia, vol. 15, No. 2, Feb. 2013, pp. 339-358.
Fu, Jingjing, et. al., "Kinect-Like Depth Data Compression". IEEE Transactions on Multimedia, vol. 15, No. 6, Oct. 2013, pp. 1340-1352.
Yang, Zhenyu, et. al., "Enabling Multi-party 3D Tele-immersive Environments with ViewCast". In ACM Transactions on Multimedia Computing, Communications and Applications, vol. 6, No. 2, (2010), pp. 111-139.
Brar, Rajwinder, "Head Tracked Multi User Autostereoscopic 3D Display Investigations". Ph.D. Thesis, De Montfort University, (2012), 193 pages.
Vertegaal, Roel, et. al., "GAZE-2: Conveying Eye Contact in Group Video Conferencing Using Eye-Controlled Camera Direction". Proceedings of the SIGCHI conference on Human factors in computing systems, (2003), 8 pages.
Lehment, Nicolas, et. al. "Creating Automatically Aligned Consensus Realities for AR Videoconferencing". IEEE International Symposium on Mixed and Augmented Reality (ISMAR), (2014), 6 pages.
Eisert, Peter, "Immersive 3-D Video Conferencing: Challenges, Concepts, and Implementations". Proceedings of SPIE Visual Communications and Image Processing (VCIP), Jul. 2003, 11 pages.
Dai, Bingbin, "Real Time 3D Reconstruction Based Tele-Presence Technology". China Master's Theses Full-text Database (CMFD), Information Science and Technology Division, Jun. 15, 2015.
Klein, Georg, et. al., "Parallel Tracking and Mapping for Small AR Workspaces". In 6th IEEE and ACM International Symposium on Mixed and Augmented Reality, ISMAR, (2007), 10 pages.
Kuster, Claudia, et. al., "FreeCam: A Hybrid Camera System for Interactive Free-Viewpoint Video". Vision, Modeling, and Visulization, (2011), 8 pages.
Milgram, Paul, et. al., "A Taxonomy of Mixed Reality Visual Displays". IEICE Transactions on Information Systems, vol. E77-D, No. 12, Dec. 1994, pp. 1-15.
Zhang, Cha, et. al., "Viewport: A Fully Distributed Immersive Teleconferencing System with Infrared Dot Pattern". IEEE MultiMedia, vol. 20, Issue: 1, Jan.-Mar. 2013.
Fuchs, Henry, et. al., "Immersive 3D Telepresence". IEEE Computer Society,, Jul. 2014, pp. 46-52.
International Preliminary Report on Patentability for PCT/US2017/047605 dated Feb. 26, 2019, 10 pages.
Schreer, Oliver, et. al., "3DPRESENCE—A System Concept for Multi-User and Multi-Party Immersive 3d Videoconferencing", (2008), 8 pages.
Mekuria, Rufael, et. al., "Enabling Geometry Based 3D Tele-Immersion with Real-Time Mesh Compression and Linear Rateless Coding". IEEE Transactions on Multimedia, Dec. 2014, 14 pages.
Maimone, Andrew, et. al., "Enhanced Personal Autostereoscopic Telepresence System Using Commodity Depth Camera". Preprinted submitted to Computers & Graphics, Sep. 3, 2012, 18 pages.
Wang, Xiangyu., et. al., "Mutual awareness in collaborative design: An Augmented Reality Integrated Telepresence System". Computers in Industry, vol. 65, (2014), pp. 314-324.
Deshpande, Sachin, "On-Display Spatial Audio for Multiple Applications on Large Displays". Proceedings of the 2nd ACM International Workshop on Immersive Media Experiences, ACM, (2014), pp. 19-22.
Okada, Ken-Ichi, et. al. "Multiparty Videoconferencing at Virtual Social Distance: MAJIC Design". Proceedings of the 1994 ACM Conference on Computer Supported Cooperative Work, (1994), pp. 385-393.
Panacast, "Panacast 2 B6 Wide Angle Video Conference Camera". Web Archive dated Jul. 31, 2015, available at: https://web.archive.org/web/20150731015305/https://www.videoconferencegear.com/panacast-2-4k-video-conference-camera-ultra-wide-angle-180-degrees/, 3 pages.
Saffar, Mohammad, "Logitech Webcam BCC950 A Conference Cam", YouTube link, published on Mar. 26, 2012, 40 pages.
Written Opinion of the International Preliminary Examining Authority for PCT/US2018/035435 dated Jun. 3, 2019, 10 pages.
Buxton, William, "Interfaces for Multiparty Videoconferencing". In K. Finn, A. Sellen & S. Wilber (Eds.). Video Mediated Communication. Hillsdale, N.J.: Erlbaum, (1997), pp. 385-400.
International Preliminary Report on Patentability for PCT/US2018/035435 completed on Sep. 12, 2019, 17 pages.
Omnijoin, "White Paper: How to Get More Out of Your Telepresence Installation with Unified Interoperable Video Conferencing Technology". An OmniJoin White Paper, (2016), pp. 1-8.
Dong, Li, "Three Trends Driving Videoconferencing Technologies Forward". Huawei, (2012), pp. 1-7.
Kauff, Peter, et. al., "An Immersive 3D Video-Conferencing System Using Shared Virtual Team User Environments." In Proceedings of the 4th International Conference on Collaborative Virtual Environments, (2002), pp. 105-112.
Second Life Wiki. "Streaming Video in Second Life." Retrieved from http://wiki.secondlife.com/wiki/Streaming_Video_in_Second_Life#Streaming_Video_into_Second_Life, last modified Apr. 16, 2016, 10 pages.
Prisco, Giulio, "Second Life, Viewer 2.0." Retrieved from http://giulioprisco.blogspot.com/2010/02/second-life-viewer-20.html, Feb. 23, 2010, 7 pages.

(56) References Cited

OTHER PUBLICATIONS

Hayden, Scott, "Mobile VR Headset Veeso Aims to Bring Face Tracking to VR." Retrieved from http://www.roadtovr.com/mobile-headset-veeso-aims-bring-face-tracking-vr, Jul. 25, 2016, 4 pages.
Simonite, Tom, "Oculus Rift Hack Transfers Your Facial Expressions onto Your Avatar." Retrieved from https://www.technologyreview.com/s/537566/oculus-rift-hack-transfers-your-facial-expressions-onto-your-avatar/, May 20, 2015, 9 pages.
Pan, Ye, et. al., "A Gaze-Preserving Situated Multiview Telepresence System." In Proceedings of the SIGCHI Conference on Human Factors in Computing Systems (CHI '14), Apr. 26-May 1, 2014, pp. 2173-2176.
Kovach, Ron, "Interview with Mia Lewin and Bill Hanley of Kontor. Neocon 2016." Design Applause, retrieved from https://designapplause.com/design/interview-with-mia-lewin-and-bill-hanley-of-kontor-neocon-2016/197983/, Jun. 11, 2016, pp. 1-7.
Wikipedia, "Voronoi diagram." Wikipedia, retrieved from: https://en.wikipedia.org/w/index.php?title=Voronoi_diagram&oldid=642351381, edited on Jan. 13, 2015, 10 pages.
"Getting Started with The Graph Partitioning Code." Retrieved from https://www.math.ksu.edu/~albin/matlab_html/graph_partitioning/gp_demo.html, Nov. 21, 2014, 15 pages.
"3DPresence: The 3D Telepresence and 3D-Aware Next Generation Immersive Videoconferencing Project." Internet Archive. Captured on Apr. 15, 2012. Retrieved from https://web.archive.org/web/20120415233329/http:/www.3dpresence.org/index.php.
Divorra, Oscar, et. al., "Towards 3D-Aware Telepresence: Working on Technologies Behind the Scene". Submitted to CSCW'10, Feb. 6-10, 2010, 4 pages.
Huang, Yai-Pai, "Auto-stereoscopic 3D Display and Its Future Developments". Society for Information Display (SID) seminar, Abstract, May 2012, 1 page.
Huang, Yi-Pai, et. al. "Time-Multiplexed Auto-stereoscopic 3D Display by Using Scanning LC-lens and Fine-stripe Backlight". Conference Presentation CC3DR, (2012), 1 page.
Knies, Rob, "Making Virtual Meetings Feel Real". Microsoft Research , Mar. 9, 2009, at: http://research.microsoft.com/en-us/news/features/personaltelepresencestation-030909.aspx. (6 pages).
Buxton, William, et. al., "Interfaces for Multiparty Videoconferences". K. Finn, A. Sellen & S. Wilber (Eds.), Video Mediated Communication, (1997), pp. 385-400 (11 pages).
Siltanen, Pekka, et. al., "An Architecture for Remote Guidance Service". Transdisciplinary Lifecycle Analysis of Systems, IOS Press, Advances in Transdisciplinary Engineering; vol. 2 (2015). p. 288-297 (10 pages).
Boyle, Michael, et. al., "The Effects of Filtered Video on Awareness and Privacy". In Proceedings of the ACM conference on Computer supported cooperative work (CSCW '00), (2000), (10 pages).
3DPresence, "Specification of Multi-View Acquisition System, Version 1.0". Deliverable D1.1, Network Media, (2007), pp. 1-48 (48 pages).
Moons, Theo, et. al., "3D Reconstruction from Multiple Images Part 1: Principles". Foundations and Trends in Computer Graphics and Vision, vol. 4, No. 4. (2008), (113 pages).
Izadi, Shahram, et. al., "KinectFusion: Real-Time 3D Reconstruction and Interaction Using A Moving Depth Camera". Proceedings of the 24th annual ACM symposium on User interface software and technology ACM, Oct. 2011, pp. 559-568 (10 pages).
Kato, Hirokazu, et. al., "Marker Tracking and HMD Calibration for A Video-Based Augmented Reality Conferencing System". Proceedings of the 2nd IEEE and ACM International Workshop on Augmented Reality '99, Oct. 20-21, 1999, pp. 85-94 (10 pages).
Klein, Georg et. al., "Parallel Tracking and Mapping for Small AR Workspaces". Mixed and Augmented Reality, 2007. ISMAR 2007. 6th IEEE and ACM International Symposium, Nov. 2007, (10 pages).
Seitz, Steven M., et. al., "A Comparison and Evaluation of Multi-View Stereo Reconstruction Algorithms". IEEE Computer Society Conference on Computer Vision and Pattern Recognition (CVPR'06), (2006) (8 pages).
Reitmayr, Gerhard, et. al., "Semi-Automatic Annotations in Unknown Environments". Proceedings of the 2007 6th IEEE and ACM International Symposium on Mixed and Augmented Reality, IEEE Computer Society, (2007), (4 pages).
Siltanen, Sanni, et. al., "Automatic Marker Field Calibration". Proceedings of Virtual Reality International Conference (VRIC), Apr. 2007, (7 pages).
Brückner, Marcel, et. al., "Active Self-calibration of Multi-camera Systems". Joint Pattern Recognition Symposium, Springer-Verlag Berlin Heidelberg, Sep. 2010, pp. 1-10 (10 pages).
Zhang, Zhengyou, "A Flexible New Technique for Camera Calibration". Microsoft Corporation, MSR-TR-98-71, last updated on Aug. 13, 2008, (22 pages).
Wang, Jungfeng., et. al., "An Augmented Reality Based System for Remote Collaborative Maintenance Instruction of Complex Products". 2014 IEEE International Conference on Automation Science and Engineering (CASE), (2014), pp. 309-314.
Kim, Seungwon, et. al., "Improving co-presence with augmented visual communication cues for sharing experience through video conference," 2014 IEEE International Symposium on Mixed and Augmented Reality (ISMAR), (2014), pp. 83-92 (6 pages).
Celozzi, Cesare, et. al., "A 6-DOF ARTag-based tracking system". IEEE Transactions on Consumer Electronics, vol. 56, No. 1, Feb. 2010, pp. 203-210 (8 pages).
Jun, Jia, et. al., "An Extended Marker-Based Tracking System for Augmented Reality". Second International Conference on Modeling, Simulation and Visualization Methods, (2010), pp. 94-97 (4 pages).
Siltanen, Sanni, "Theory and Applications of Marker-Based Augmented Reality". VTT Science 3, Espoo, (2012), (246 pages).
Basso, Filippo, et. al., "Online Calibration for Networks of Cameras and Depth Sensors", OMNIVIS: The 12th Workshop on Non-classical Cameras, Camera Networks and Omnidirectional Vision—2014 IEEE International Conference on Robotics and Automation (ICRA 2014), Jun. 2014, (6 pages).
Wikipedia, "Motion Estimation". Web Archive dated Nov. 8, 2015, at: https://web.archive.org/web/20151108162609/https://en.wikipedia.org/wiki/Motion_estimation, (2 pages).
Devincenzi, Anthony, et. al., "Kinected Conference: Augmenting Video Imaging with Calibrated Depth and Audio". CSW 2011, Mar. 19-23, 2011. ACM 978-1-4503-0556-3/11/03, pp. 621-624 (4 pages).
Hubers, Alexander, et. al. "Video Manipulation Techniques for the Protection of Privacy in Remote Presence Systems". ACM, Jan. 13, 2015. Available at: http://arxiv.org/pdf/1501.03188v1.pdf, (14 pages).
Dayrit, Fabian, "Free-viewpoint Image Generation-based Human Motion Reenactment from a Single RGB-D Video Stream", Master's Thesis, Mar. 13, 2014. Available at: http://yokoya.naist.jp/paper/datas/1346/enzothesis.pdf, (54 pages).
Fuchs, Henry, et. al., "Virtual Space Teleconferencing using a Sea of Cameras". Proceedings First International Conference on Medical Robotics and Computer Assisted Surgery (vol. 26), Sep. 1994, (7 pages).
Henry, Peter, et. al., "RGB-D Mapping: Using Kinect-Style Depth Cameras for Dense 3D Modeling of Indoor Environments", The International Journal of Robotics Research, The Author's (2012), (17 pages).
Baričević, Domagoj, et. al., "A Hand-Held AR Magic Lens with User-Perspective Rendering". 2012 IEEE International Symposium on Mixed and Augmented Reality (ISMAR) (2012), (10 pages).
International Search Report and Written Opinion of the International Searching Authority for PCT/US2017/024072 dated Jul. 28, 2017, (18 pages).
Bao, Paul, et. al., "Mobile collaborative walkthrough using 3D image warping and streaming", Information Technology Interfaces, 2004. 26th International Conference On Cavtat, Croatia Jun. 7-10, 2004, Piscataway, NJ, USA, IEEE, Jun. 7, 2004 (Jun. 7, 2004), pp. 279-285 vol. 1, XP032126540, ISBN: 978-953-96769-9-3, the whole document. ( 7 pages).
Written Opinion of the International Preliminary Examining Authority for PCT/US2017/024072 dated Mar. 1, 2018 (4 pages).
International Preliminary Report on Patentability for PCT/US2017/024072 completed on Jun. 11, 2018 (10 pages).

(56) References Cited

OTHER PUBLICATIONS

Kantonen, Tuomas, et. al., "Mixed Reality in Virtual World Teleconferencing", IEEE Virtual Reality 2010, Mar. 2010, pp. 179-182 (4 pages).
International Search Report and Written Opinion of the International Searching Authority for PCT/US2017/026378 dated Jun. 29, 2017, (16 pages).
Chen, Henry, et. al., "3D Collaboration Method over HoloLens (TM) and Skype(TM) End Points", Immersive Media Experiences, ACM, 2 Penn Plaza, Suite 701 New York NY 10121-0701 USA, Oct. 30, 2015 (Oct. 30, 2015). pp. 27-30, XP058074925, DOI: 10.1145/2814347.2814350, ISBN: 978-1-4503-3745-8 (4 pages).
Irlitti, Andrew, et. al., "Tangible interaction techniques to support asynchronous collaboration", 2013 IEEE International Symposium On Mixed and Augmented Reality (ISMAR), IEEE, Oct. 1, 2013 (Oct. 1, 2013), XP032534747, DOI: 10.1109/ISMAR.2013. 6671840, [retrieved on Nov. 20, 2013] abstract, paragraph [What_are_the_benefits] pp. 1-6 (6 pages).
Written Opinion of the International Preliminary Examining Authority for PCT/US2017/026378 dated Mar. 6, 2018 (9 pages).
International Preliminary Report on Patentability for PCT/US2017/026378 completed on Jul. 3, 2018 (16 pages).
Claudia Kuster, Tiberiu Popa, Jean-Charles Bazin, Craig Gotsman, Markus Gross (2012), "Gaze Correction for Home Video Conferencing", ACM Transactions on Graphics, vol. 31, No. 6, Article 174, Nov. 2012, (6 pages).
D. Roberts, R. Wolff, J. Rae, A. Steed, R. Aspin, M. McIntyre, A. Pena, O. Oyekoya, and W. Steptoe (2009), "Communicating Eyegaze Across a Distance: Comparing an Eye-gaze enabled Immersive Collaborative Virtual Environment, Aligned Video Conferencing, and Being Together", in IEEE Virtual Reality 2009, Lafayette, USA, 2009 pp. 135-142 (8 pages).
Henry Fuchs and Andrei State (2014), "Immersive 3D Telepresence", Computer, vol. 47, No. 7, IEEE Computer Society, 2014, (7 pages).
Cha Zhang, Qin Cai, Philip A. Chou, Zhengyou Zhang, Ricardo Martin-Brualla (2013), "Viewport: A Distributed, Immersive Teleconferencing System with Infrared Dot Pattern," IEEE Multimedia, vol. 20, No. 1, pp. 17-27, Jan.-Mar. 2013, pp. 17-27 (11 pages).
Kuster, C., et. al., "Towards next generation 3D Teleconference Systems". In 3DTV-Conference: The True Vision-Capture, Transmission and Display of 3D Video (3DTV-CON), (2012), IEEE, (4 pages).
Loop, C., et. al., "Real-Time High Resolution Sparse Voxelization with Application to Image-Based Modeling". In Proceedings of the 5th High-Performance Graphics Conference, ACM, Jul. 2013, (7 pages).
Peter Kauff et al: "An Immersive 3D Video-Conferencing System using Shared Virtual Team User Environments", Proceedings of the 4th. Intl Conference On Collaborative Virtual Environments. CVE 2002. Bonn, Germany, Sep. 30-Oct. 2, 2002; ACM, US, No. 4th, Sep. 30, 2002 (Sep. 30, 2002), XP002633305, ISBN: 978-1-58113-489-6 p. 105-112 ( pages).
International Preliminary Report on Patentability for PCT/US2015/059576 dated Feb. 21, 2017, (16 pages).
Written Opinion of the International Preliminary Examining Authority for PCT/US2015/059576 dated Oct. 11, 2016, (8 pages).
International Search Report and the Written Opinion of the International Searching Authority, or the Declaration for PCT/US2015/059576 dated Feb. 4, 2016, (12 pages).
Hideyuki Nakanishi et al: "Freewalk: A meeting environment for casual communication in a net-worked community", IEEE Multimedia, vol. 6, No. 2, Apr. 1, 1999 (Apr. 1, 1999), pp. 20-28, XP055243760, DOI: 10.1109/93.771370 the whole document (9 pages).
Peter Quax et al: "A multi-user framework supporting video-based avatars" Proceedings of 2nd Workshop On Network and System Support for Games, Netgames '03, Jan. 1, 2003 (Jan. 1, 2003), pp. 137-147, XP055243989, New York, New York, USA DOI: 10.1145/963900.963913 ISBN: 978-1-58113-734-7 the whole document.
Real Video conference system implemented in a virtual world. (Second Life), IP.com Journal, IP.com Inc., West Henrietta, NY, US, Nov. 12, 2009 (Nov. 12, 2009), XP013135315, ISSN: 1533-0001 the whole document.

\* cited by examiner

SYSTEM AND METHOD FOR AUGMENTED REALITY MULTI-VIEW TELEPRESENCE

CROSS-REFERENCE TO RELATED APPLICATIONS

This application is a continuation of U.S. patent application Ser. No. 15/752,239, entitled "System and Method for Augmented Reality Multi-View Telepresence" and filed Feb. 12, 2018, which is hereby incorporated by reference in its entirety, and which is a national stage application under 35 U.S.C. § 371 of International Application No. PCT/US2016/046848, entitled "System and Method for Augmented Reality Multi-View Telepresence" and filed Aug. 12, 2016, which claims benefit under 35 U.S.C. § 119(e) from U.S. Provisional Patent Application No. 62/205,487, entitled "System and Method for Augmented Reality Multi-View Telepresence" and filed Aug. 14, 2015.

FIELD

This present disclosure relates to information sharing among users with the use of augmented reality (AR) systems, such as head mounted displays (HMDs), tablets, mobile phones, smart phones, projectors, and the like.

BACKGROUND

Videoconferencing and telepresence solutions are becoming more and more important in supporting environmentally friendly and efficient ways of work and life. It is common for multiple parties to each have a camera/monitor setup in order to communicate via the internet or mobile network. Furthermore, designated telepresence rooms may have multiple camera/monitor displays in order to communicate with numerous parties in separate locations. However, current telepresence systems only offer poor support for spatial properties of a physical meeting, e.g. eye contact and viewpoints (lines-of-sight) between multiple participants. Another issue with current telepresence systems is inconsistency of geometries across meeting sites. In a physical meeting around a table, the same geometry is shared between all participants or groups of participants in the meeting room. A problem in many teleconferencing systems is that the users' perceptions of the (virtual) meeting geometry are not the same across different meeting sites. This occurs for example when the displays showing remote participants are arranged in a lined-up fashion. Respectively, local participants at each site deviate from this lined-up geometry, which results in having different meeting geometries across sites.

SUMMARY

Embodiments described in this disclosure relate to a new immersive multiparty telepresence system based on AR technologies. In some embodiments, the techniques disclosed herein provide a means for assigning a virtual geometry to a virtual meeting space, along with various techniques of capturing participant location, and displaying remote video feeds received from remote participants.

One embodiment takes the form of a method that includes obtaining a session geometry of a multi-location telepresence session that includes a first-location participant at a first location and a second-location participant at a second location. The first location has a plurality of first-location cameras and a plurality of first-location display segments, and the second location has a plurality of second-location cameras and a plurality of second-location display segments. As used herein, the term display segments includes but is not limited to tessellated (i.e., tiled) display segments (e.g., hardware displays beside one other) as well as sliding and even overlapping display segments (e.g., on a multi-view display); in general, display segments can be separate devices and/or separate (even overlapping) regions of the same device, or some combination thereof. The method also includes selecting, according to the session geometry, a first-to-second-viewpoint second-location camera from the plurality of second-location cameras. The method also includes selecting, according to the session geometry, a first-to-second-viewpoint first-location display segment from the plurality of first-location display segments. The method also includes receiving a first-to-second-viewpoint video stream captured by the selected first-to-second-viewpoint second-location camera. The method also includes generating a line-of-sight augmented-reality experience for the multi-location telepresence session at least in part by rendering the received first-to-second-viewpoint video stream via the selected first-to-second-viewpoint first-location display segment.

In at least one embodiment, obtaining the session geometry comprises assigning at least part of the session geometry.

In at least one embodiment, obtaining the session geometry comprises receiving at least part of the session geometry.

In at least one embodiment, at least one of the cameras in the combined pluralities of first-location cameras and second-location cameras is a monoscopic camera.

In at least one embodiment, at least one of the cameras in the combined pluralities of first-location cameras and second-location cameras is a stereoscopic camera.

In at least one embodiment, a first-location head-mounted augmented-reality device includes the selected first-to-second-viewpoint first-location display segment.

In at least one embodiment, at least two of the first-location display segments in the plurality of first-location display segments are on two separate respective display devices at the first location.

In at least one embodiment, the method also includes generating a virtual meeting space that reflects the session geometry; in at least one such embodiment, rendering the received first-to-second-viewpoint video stream includes rendering the received first-to-second-viewpoint video stream as appearing in the virtual meeting space.

In at least one embodiment, the method also includes identifying, according to the session geometry, a first-to-second viewing orientation of the first-location participant with respect to the second-location participant; in at least one such embodiment, selecting the first-to-second-viewpoint second-location camera from the plurality of second-location cameras according to the session geometry includes determining that, among the second-location cameras in the plurality of second-location cameras, a given second-location camera most closely bears the identified first-to-second viewing orientation to the second participant; and designating the given second-location camera as being the selected first-to-second-viewpoint second-location camera; moreover, in at least one such embodiment, selecting the first-to-second-viewpoint first-location display segment from the plurality of first-location display segments according to the session geometry includes determining that, among the first-location display segments in the plurality of first-location display segments, a given first-location display segment is the one to which the first participant most closely bears the identified first-to-second-viewing orientation; and designating the given first-location display segment as being the selected first-to-second-viewpoint first-location display segment.

In at least one embodiment, the method also includes selecting, according to the session geometry and from the plurality of first-location cameras, a second-to-first-viewpoint first-location camera that bears substantially the same orientation to the first-location participant as the selected first-to-second-viewpoint first-location display segment bears to the first-location participant; and capturing a second-to-first-viewpoint video stream of the first participant using the selected second-to-first-viewpoint first-location camera; in at least one such embodiment, generating the line-of-sight augmented-reality experience for the multi-location telepresence session further includes transmitting the captured second-to-first-viewpoint video stream to the second location for rendering via a second-location display segment that bears substantially the same orientation to the second-location participant as the selected first-to-second-viewpoint second-location camera bears to the second-location participant.

In at least one embodiment, the method also includes cropping the captured second-to-first-viewpoint video stream to substantially display a head (e.g., a head and shoulders) of the first participant prior to transmitting the captured second-to-first-viewpoint video stream to the second location.

In at least one embodiment, the method also includes selecting, according to the session geometry and from the plurality of first-location cameras, a respective other-to-first-viewpoint first-location camera for each of one or more other-location participants at respective other locations; and capturing a respective other-to-first-viewpoint video stream of the first participant using each of the one or more selected other-to-first-viewpoint first-location cameras; in at least one such embodiment, generating the line-of-sight augmented-reality experience for the multi-location telepresence session further includes transmitting each respective captured other-to-first-viewpoint video stream to the corresponding other location for rendering via a respective other-location display segment that bears substantially the same orientation to the respective other-location participant as the first participant bears to the corresponding respective other-to-first-viewpoint first-location camera.

In at least one embodiment, the method also includes selecting, according to the session geometry and from the plurality of first-location display segments, a respective first-to-other-viewpoint first-location display segment for each other-location participant, where each selected first-to-other-viewpoint first-location display segment bears substantially the same orientation to the first participant as the selected other-to-first-viewpoint first-location camera associated with the same other-location participant bears to the first participant; and receiving a respective first-to-other-viewpoint video stream from each other-location participant, each received first-to-other-viewpoint video stream having been captured from a first-to-other-viewpoint other-location camera that bears substantially the same orientation to the corresponding other participant as the first participant bears to the corresponding first-to-other-viewpoint first-location display segment; in at least one such embodiment, generating the line-of-sight augmented-reality experience for the multi-location telepresence session further includes rendering the corresponding received first-to-other-viewpoint video streams via the corresponding selected first-to-other-viewpoint first-location display segments.

In at least one embodiment, the first location comprises a wall on which the first-location cameras in the plurality of first-location cameras are mounted.

Another embodiment takes the form of a head-mounted augmented-reality device that includes a display comprising a plurality of plurality of first-location display segments; a processor; and data storage containing instructions executable by the processor for causing the head-mounted augmented-reality device to carry out functions including: obtaining a session geometry of a multi-location telepresence session that includes a first-location participant wearing the head-mounted augmented-reality device at a first location, the first location having a plurality of first-location cameras, the multi-location telepresence session further including a second-location participant at a second location, the second location having a plurality of second-location cameras and a plurality of second-location display segments; selecting, according to the session geometry, a first-to-second-viewpoint second-location camera from the plurality of second-location cameras; selecting, according to the session geometry, a first-to-second-viewpoint first-location display segment from the plurality of first-location display segments; receiving a first-to-second-viewpoint video stream captured by the selected first-to-second-viewpoint second-location camera; and generating a line-of-sight augmented-reality experience for the multi-location telepresence session at least in part by rendering the received first-to-second-viewpoint video stream via the selected first-to-second-viewpoint first-location display segment. Moreover, any of the variations discussed herein with respect to any method embodiments apply as well to any system and/or apparatus embodiments, and vice versa.

In at least one embodiment, a new telepresence system provides a virtual round table meeting between multiple meeting sites and participants. The users' spatial awareness of each other is supported by providing virtual line-of-sight between each and every user. The system decides on the geometry of the virtual setup based on the number of meeting sites and the positions of the participants. All meeting participants perceive substantially the same virtual geometry. In at least one embodiment, the users wear augmented reality (AR) glasses to see their remote counterparts augmented in their virtual but realistic positions. In some embodiments, "actual positions" (i.e., relative positions in each of their respective meeting rooms) of users are detected by tracking a set of AR markers or fiducials. Natural and/or virtual viewpoints may be provided by a dense array of wide-angle cameras, whose position is known with respect to the markers, and thus their orientation to the users. The system selects the opposite two cameras that fall on the line-of-sight between two remote users, crops the head and shoulders view of their panorama views, and sends the cropped view to the other end to be augmented. The system supports a variable number of meeting sites and users, as well as users' mobility within the room. As an option, the concept can be implemented in Virtual Reality (by VR glasses) or by using multi-user 3D displays. Thus, users' respective "actual positions" in practice are their respective relative positions in each of their respective meeting rooms. Further, in at least one embodiment, this positioning/tracking is made by AR glasses. In some embodiments, users' geographic (world coordinate) positions (derived, e.g., by GPS and/or extended GPS can be used as part of forming the virtual geometry.

In at least one embodiment, a new augmented reality based telepresence system which mimics a physical meeting between multiple meeting sites and participants is disclosed.

In at least one embodiment, each remote party is represented by a separate proxy in a local meeting space. The basic element of a proxy is a dedicated wide-angle camera acting as the remote users eyes, and defining an area to augment their facial videos. In some embodiments, number of cameras depends linearly on the maximum number of meeting participants. In some embodiments, proxy cameras are assembled on the wall or in a frame in a linear or arc formation.

In some embodiments, the system decides on the allocation of proxy cameras based on the number of meeting sites and the actual positions of the participants. In some embodiments, camera positions are known with respect to a set graphical markers or fiducials.

In some embodiments, the actual user positions are detected by tracking the above set of AR markers by each user's HMD camera. In some embodiments, remote participants' views are allocated on the assembly of wide-angle proxy cameras. In some embodiments, each local participant's orientation with respect to proxies is known by the system.

In some embodiments, using the knowledge of users' positions, the system crops the head and shoulders view of users' panorama views, and sends them to the other sites to be augmented. In some embodiments, the remote persons are augmented on the allocated camera positions from individual viewpoints for each local user. In some embodiments, the users wear AR glasses to see their remote counterparts augmented at the positions defined by their proxy (chosen camera location in local space).

In some embodiments, the system supports a variable number of meeting sites and users, as well as users' mobility within the room.

DETAILED DESCRIPTION

Figure 1:
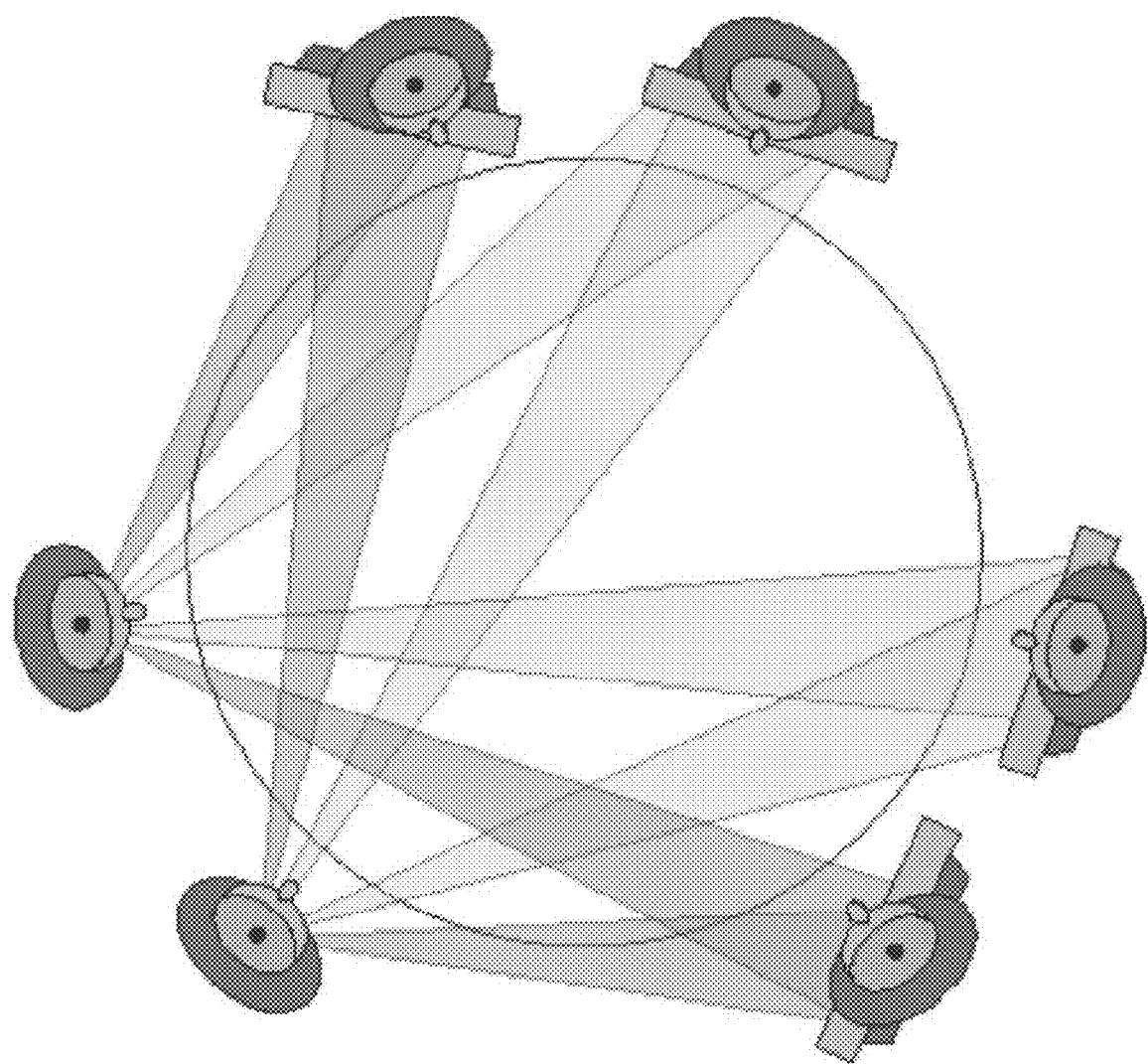
FIG. 1 depicts participants in a physical meeting, in which participants see the same counterparties from different viewpoints.

FIG. 1 depicts participants in a physical meeting, in which participants see the same counterparties from different viewpoints. Eye contact is known to help communication e.g. by expressing emotions, indicating turn taking, and building trust between participants. Eye contact is a result of gazing in 3D space, and supporting spatiality helps to understand and memorize a message, and builds awareness about the identities, roles, actions, and information flow between participants. Imperfect eye contact is one reason why videoconferencing systems lack the naturalness of face-to-face meetings. Eye contact is disturbed by parallax distortions, both in horizontal and vertical directions.

Figure 2A:
FIGS. 2A, 2B depict examples of horizontal and vertical parallax, respectively.

Horizontal distortion can stem from the fact that typically one or at most only few cameras are being used for replacing the eyes of all remote participants in the meeting (e.g. videoconferencing on a laptop PC). This means relegating at least some users' viewpoints to sub-optimal directions. This distortion can be reduced by an increased number of cameras being placed into correct positions. An example of horizontal distortion is depicted in FIG. 2A. Shown in FIG. 2A is a viewpoint from a local participant to a screen. The man on the screen is supposed to be looking directly at the viewpoint of the local participant; however, due to the horizontal parallax, it appears the man on the screen is looking off to the local participant's right.

Figure 2B:

Vertical parallax distortion on the other hand often stems from the displacement of a camera (remote participant's eyes) from his/her faces on the display. When the remote participant looks to the eyes on the display, he/she looks away from the camera (located typically over the display). An example of vertical parallax is depicted in FIG. 2B. As shown in FIG. 2B, the woman is staring at the face on the screen; however, since the camera is on the top of the screen, it will appear as if she is looking down.

A well-known way of supporting eye contact and spatial awareness is to bring the remote participants as electronic proxies or surrogates to each meeting room, as described in Buxton, W., Sellen, A. & Sheasby, M. (1997), "Interfaces for multiparty videoconferencing", In K. Finn, A. Sellen & S. Wilber (Eds.). Video Mediated Communication. Hillsdale, N.J.: Erlbaum, 1997, pp. 385-400. All these surrogates are equipped with their own camera, display, microphone and speaker, and act as physical replacements of remote participants. These surrogates are usually positioned freely at each meeting room, leading to possible geometry mismatch; although users may perceive direct eye contact correctly when using proxy-based systems, other directions are ambiguous.

Figure 3:
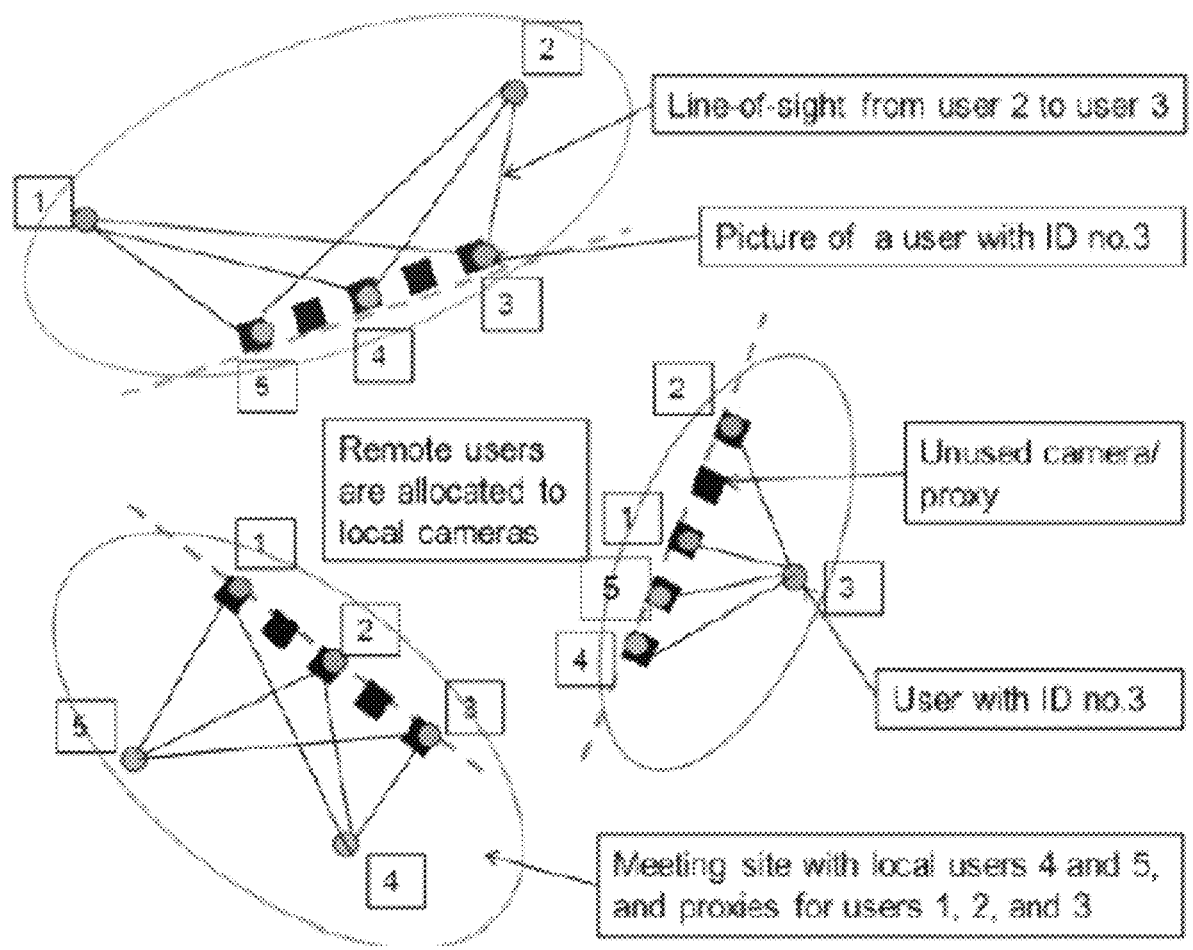
FIG. 3 is a plan view of an example of a telepresence system bringing remote participants to each meeting site as proxies or surrogates.

FIG. 3 is an example of a telepresence system bringing remote participants to each meeting site as proxies or surrogates (with a dedicated camera, display, microphone and speaker). In some embodiments, a selected-in-advance maximum number of proxies is used and allocated for users according to a rule (i.e., it may be the case that not all proxies are always in use). In embodiments in which AR glasses, HMDs, and the like are used for displays, remote users (i.e., their eyes), can be augmented on the camera, thus avoiding parallax problems that can arise in other implementations. Unlike in a meeting around the same table (as in FIG. 1), meeting geometry is not the same across meeting sites and participants. Direct eye-contact is perceived but other directions are ambiguous. In addition to restricting users' freedom of choice, this approach is particularly challenging when the number of participants varies e.g. during the meeting. Embodiments discussed herein provide a consistent meeting geometry for a flexible number and placement of meeting participants, thus meeting the prerequisite of consistent perception of space and eye-directions between participants.

Among other aspects, this disclosure describes embodiments of a new telepresence system providing participants a sensation of a meeting around a physical meeting table. The number of local participants can vary, as well as the number of meeting sites. Furthermore, some embodiments support motion of participants throughout the room. The system decides an optimal virtual geometry between the physical meeting sites so that the participants in each meeting site have virtual lines-of-sight to each other.

Generally, teleconferencing systems bring the video(s) from the remote meeting site(s) and their people to one or several displays in the local meeting room. Often, only one camera per meeting site is used, which results with distortions, so that the facial or eye directions of the remote participants do not correspond to those of a physical meeting (due to "shared eyes" or view-points).

A way to approach a physical meeting situation is to represent each remote participant with a separate electronic representative (proxy or surrogate) in each local meeting space, as if those people would be present in the local space. This electronic surrogate consists of a video display attached with a camera (to replace remote participant's face and eyes), a microphone, and a loudspeaker. Also mobile robots (even human-like) have been suggested for such a surrogate. The approach tackles to some extent the horizontal parallax error caused by several people using the same few cameras.

Defining the Virtual Meeting Geometry

In some embodiments, in order for the system to define a virtual meeting geometry, information regarding the number of meeting sites, the number of participants in each meeting site, and the position of each participant in each meeting site must be known. In some embodiments, participants wear augmented reality Head-Mounted Displays (HMDs) or glasses (either optical or video see-through) with an embedded camera. This camera locates each user with respect to one or more fiducials (visual markers or natural images), which in the exemplary setup are attached on a nearby wall. Combining this information, the system also has information regarding the local users' positions with respect to each other, and therefore can detect if and when users within the same local meeting site change positions. In at least one embodiment, detecting when two local users change position in a meeting site relative to the wall causes the system to swap or otherwise change the users' locations in the augmented displays of remote users in the external meeting sites.

In some embodiments, participant position is captured by detecting and tracking the visual markers from HMD videos. However, other embodiments utilize other methods of obtaining participant position, such as proximity sensors or 3D sensors/depth cameras.

In some embodiments, the system detects users entering and leaving the meeting according to user input or detection. In some embodiments, the system connects and disconnects users as they enter or leave the meeting.

Figure 4:
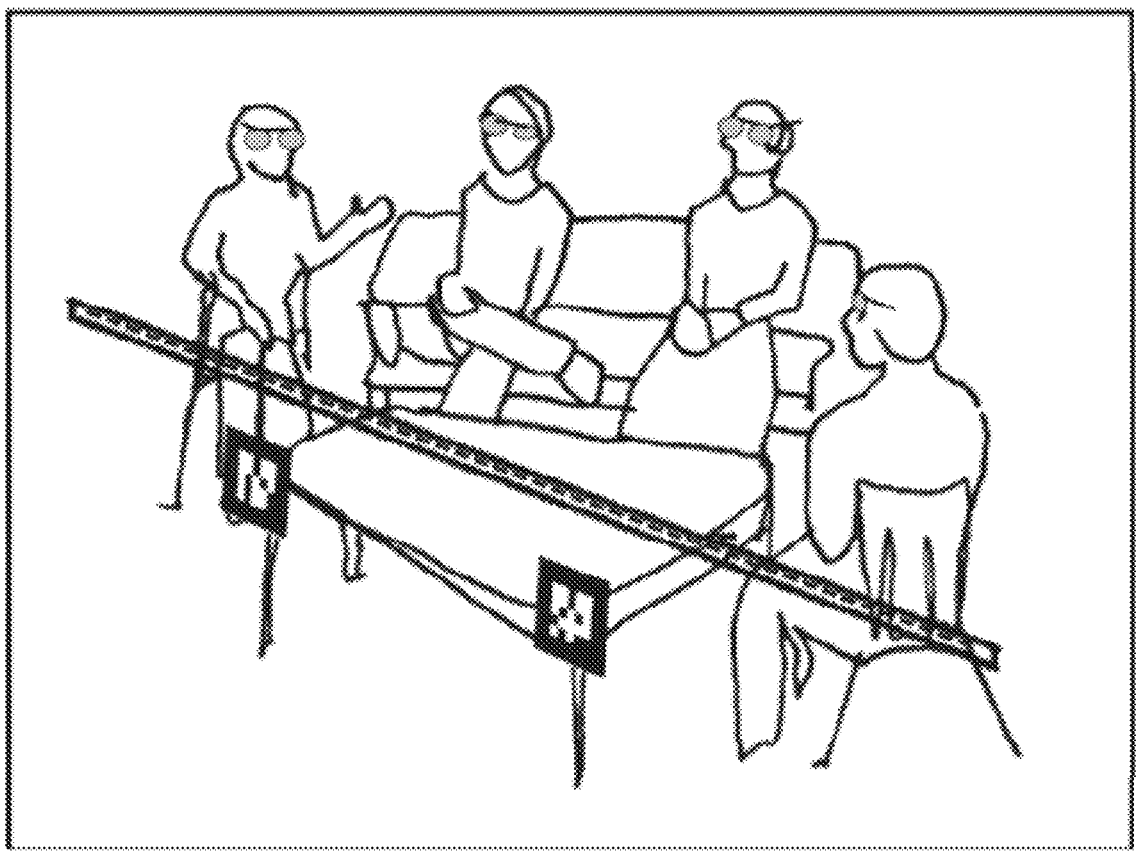
FIG. 4 depicts an example of a local meeting site with four participants, in accordance with at least one embodiment.

In addition to the visual markers, in an embodiment, a horizontal array of wide-angle cameras is located on the wall, in relation to the markers, at an average eye-level of a sitting person (approximately 125 cm above the floor level). In an embodiment, the distance of the neighboring cameras is dense enough to provide separate virtual lines-of-sight to all remote participants in the configurations being supported (limited by some maximum number of sites and participants). In some embodiments, the number of wide-angle cameras on the wall is much larger than the number of remote participants. In at least one embodiment, a great flexibility is estimated to be achieved e.g. by a 2.5 m long array of cameras, 10 cm apart of each other (a total of 26 cameras). This embodiment is illustrated in FIG. 4 showing an example of a meeting site with four participants. In embodiments where there is a larger array of cameras, there is an advantage over currently known systems in that the system supports spatiality and individual lines-of-sight in a very flexible and economic way. The flexibility includes the ability for participants to choose one's sitting point freely, and allowing participant mobility inside the meeting room. In order to support the free sitting order or even mobility of the participants, the image of each user (e.g. a head-only or head-and shoulders view) may be cropped from the wide-angle view of the best matching camera. This is possible, as the system has information regarding the user locations at each moment, i.e. the positions of the user's HMD cameras with respect to the used marker and camera setup.

In some embodiments, the cameras on the wall include wide-angle video cameras which capture user video. In some embodiments, 3D reconstruction can be performed using 3D sensors, e.g. a number of depth sensors (RGB-D or Time of Flight (ToF)). In some embodiments, 3D sensors are used to form a real-time 3D model of the meeting site. In some embodiments, 3D reconstruction is performed by capturing a meeting site with an array of video cameras and forming a real-time 3D model of the meeting site based on the video data captured by the video cameras.

Figure 5:
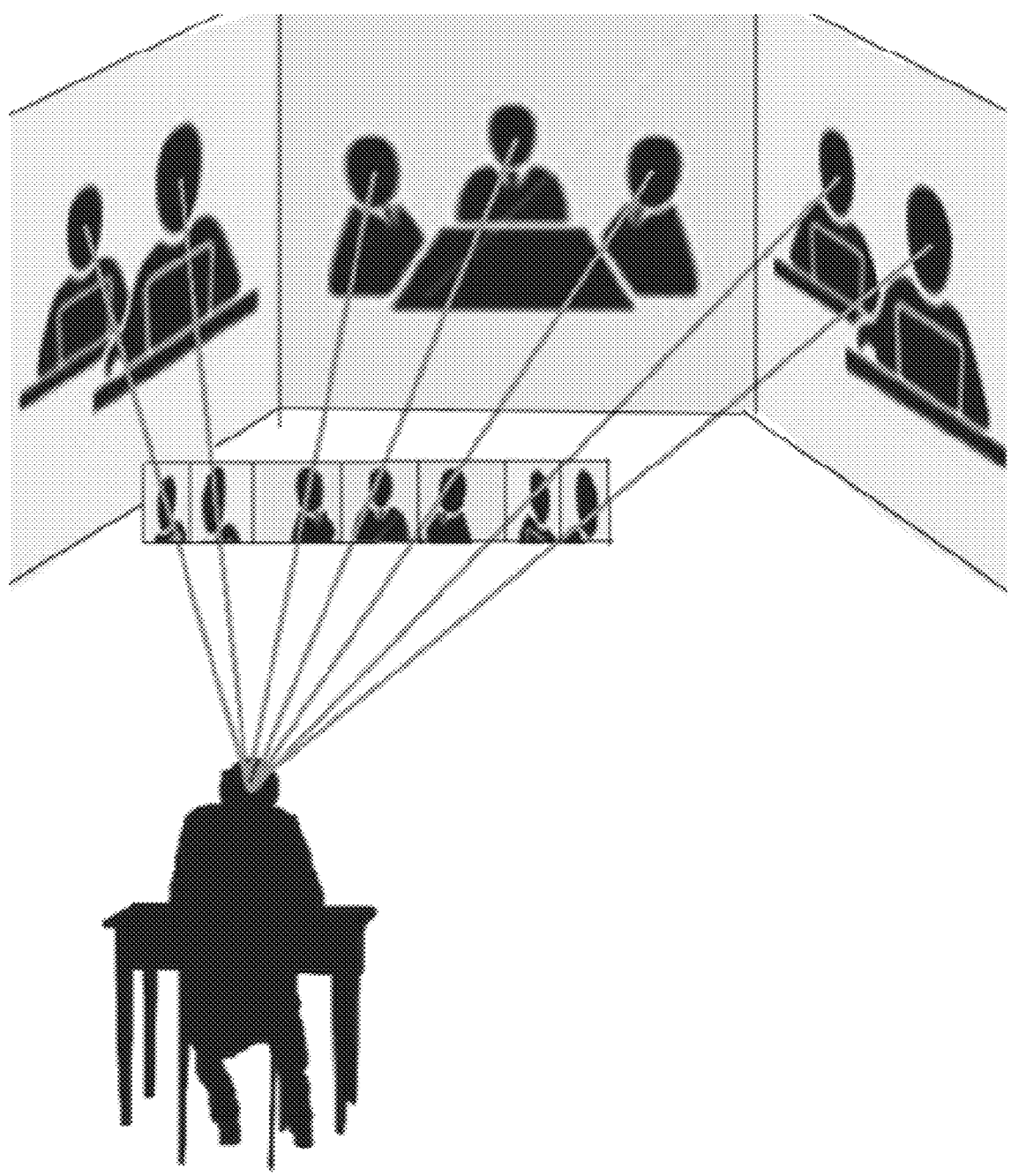
FIG. 5 depicts a virtual meeting as a virtual round table arrangement.
Figure 6:
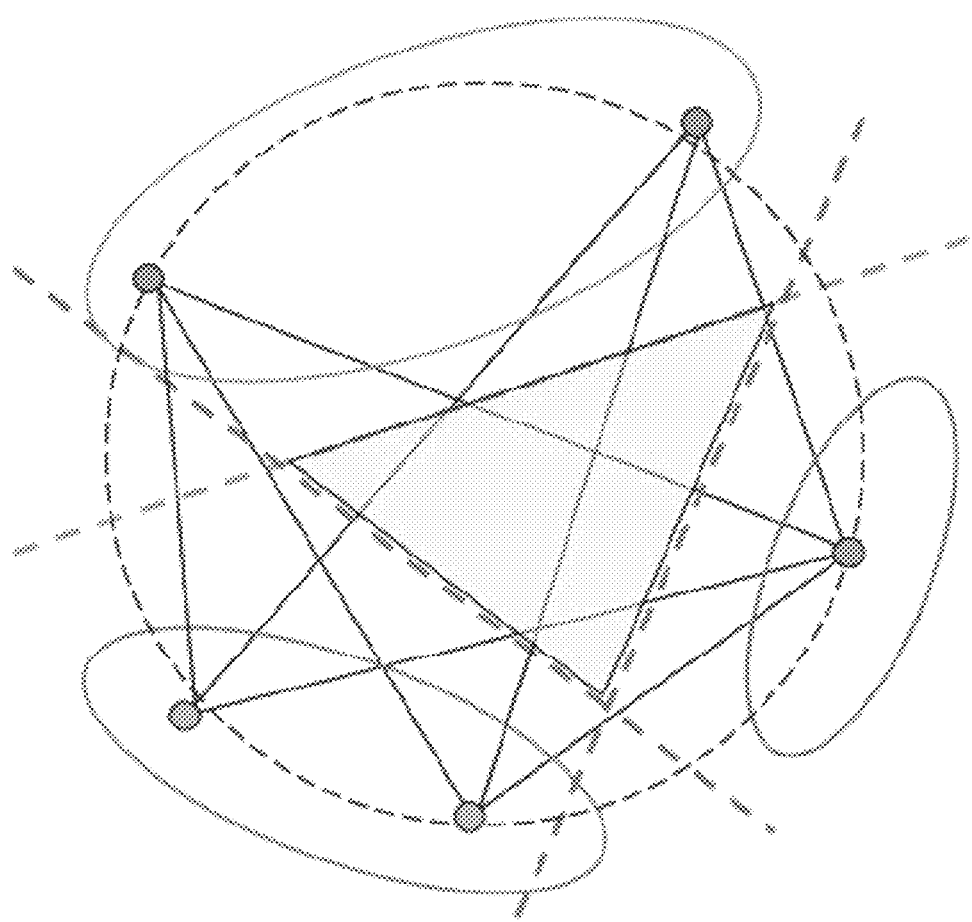
FIG. 6 depicts a plan view of a virtual layout with supported lines-of-sight for a meeting between five participants on three sites, in accordance with at least one embodiment.

In at least one embodiment, as depicted by FIG. 5, the system arranges the meeting sites in a virtual round table arrangement, optimizing the overall spatial distribution for users' visibility to each other. As in the physical world, it is generally beneficial to keep the layout (e.g. the size of a shared virtual table) as small as possible. In some embodiments, users select their sitting place, which leaves the system only the optimization of the mutual virtual orientation of the physical meeting sites. Optimization here includes "moving around" the local rigid sets of users, the number of sets being the number of meeting sites. In at least one embodiment, the number of sites (and people's locations in them) suggests a basic virtual geometry to be used, e.g. three sites with participants in a row suggest a basic shape of a triangle. If the local participants are sitting more in an arc form, the basic shape of a circle is a better choice. FIG. 6 depicts a virtual layout with supported lines-of-sight for a meeting between five participants on three sites. The optimization resulted with a virtual meeting geometry where the participants (illustrated as dots) are arranged in a circle form (illustrated as a dashed circle). The room walls with camera arrays are shown by dashed lines. The shaded triangle in the middle may be used as virtual space between real physical spaces. As the system defined its dimensions, "virtual physical" positions of all participants are known and can be used for calculating the view-points. A basic assumption for the virtual meeting geometry is that the average distance between neighboring local participants applies also cross the sites, between the virtually neighboring participants (between participants sitting "next to each other" at the end of each row in two different meeting spaces).

In at least one embodiment, further optimization can be made by adjusting the actual form (deviations from symmetry) and size of the virtual geometry. A possible optimization step is that the average distance of each participant from the virtual table's circumference is minimized. Optimization according to embodiments disclosed herein should not be limited to an exact algorithm, but rather to basic mathematics and image processing algorithms (geometry, trigonometry, pattern matching, etc.).

Figure 7:
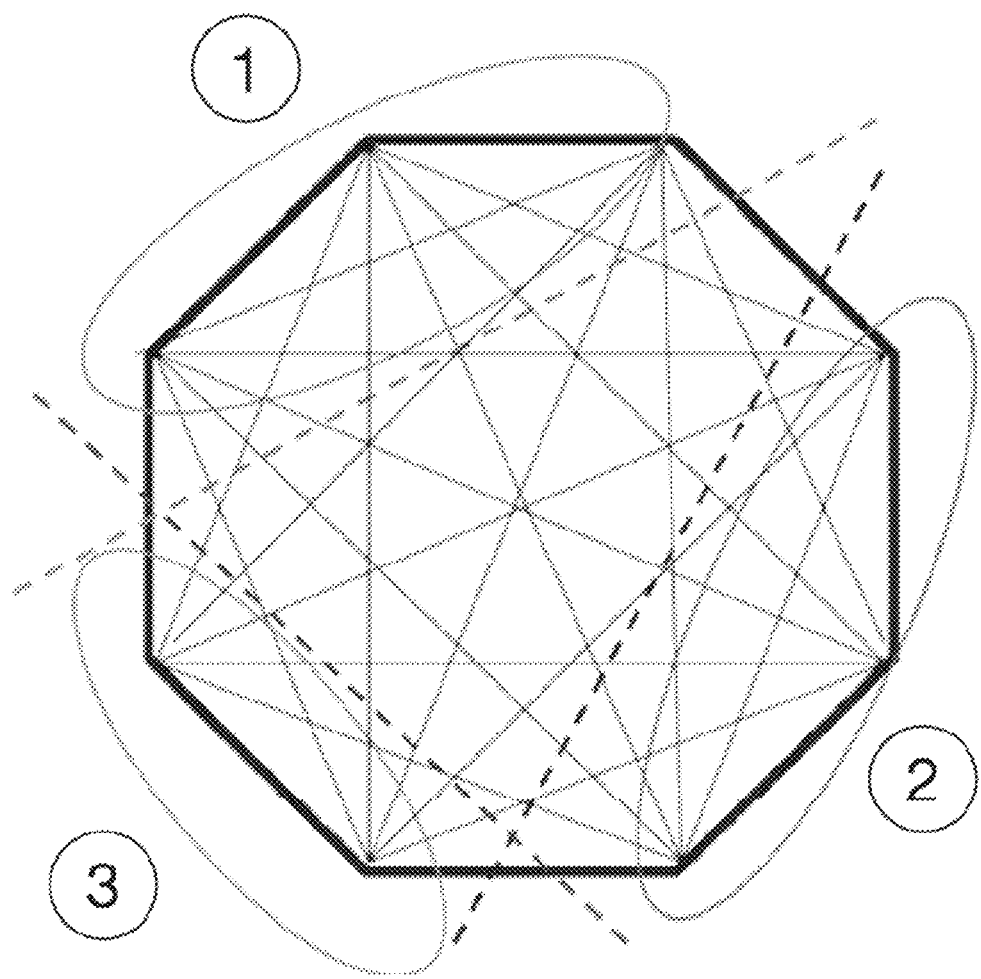
FIG. 7 depicts an example of lines-of-sight in virtual geometry for 8 participants (cf. 8 corners) in three meeting sites (cf. ovals), in accordance with at least one embodiment.
Figure 8:
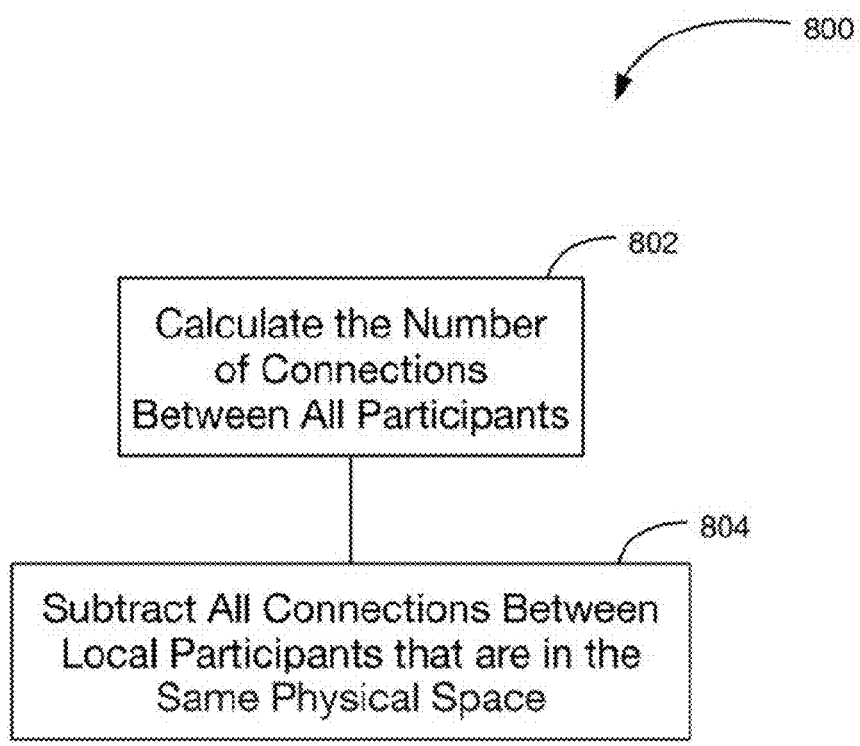
FIG. 8 depicts a method of determining the number of augmented lines-of-sight, in accordance with at least one embodiment.

In some embodiments, the number, geometry, and other properties of the lines-of-sight between participants are used in determining a virtual meeting geometry. The number of line-of-sights between N participants can be derived using, e.g., Metcalfe's law, stating that the number of connecting lines is $C_N=(N^2-N)/2$. An example virtual meeting space is depicted by FIG. 7. For 8 participants (represented as corners of the octagon as shown in FIG. 7) $C_8=28$. As local participants in a common meeting site can see each other directly (e.g. in augmented reality embodiments wherein each participant has a see-through HMD), the amount of lines-of-sight to be supported by the augmentation can be reduced. FIG. 8 depicts a method 800 of calculating the number of augmented lines-of-sight. As shown in FIG. 8, at step 802, the total number of connections between all participants (whether local or remote) is calculated, perhaps using Metcalfe's law. In step 804, the connections between local participants that are in the same physical space (which are not needed) are subtracted from the total number of connections. Referring again to FIG. 7, where $C_8=28$, it is found by the method 300 the total number of necessary augmented lines-of-sight to be $C=((28-2*(3^2-3)/2-(2^2-2)/2))=21$.

The minimum number of two-way video connections is the same as number of augmented lines-of-sight. This relationship is basically the same in current peer-to-peer (P2P) implementations of many Internet applications. If necessary, the multiple videostreams can be multiplexed and routed via a common server e.g. for better control and less bandwidth.

Figure 11:
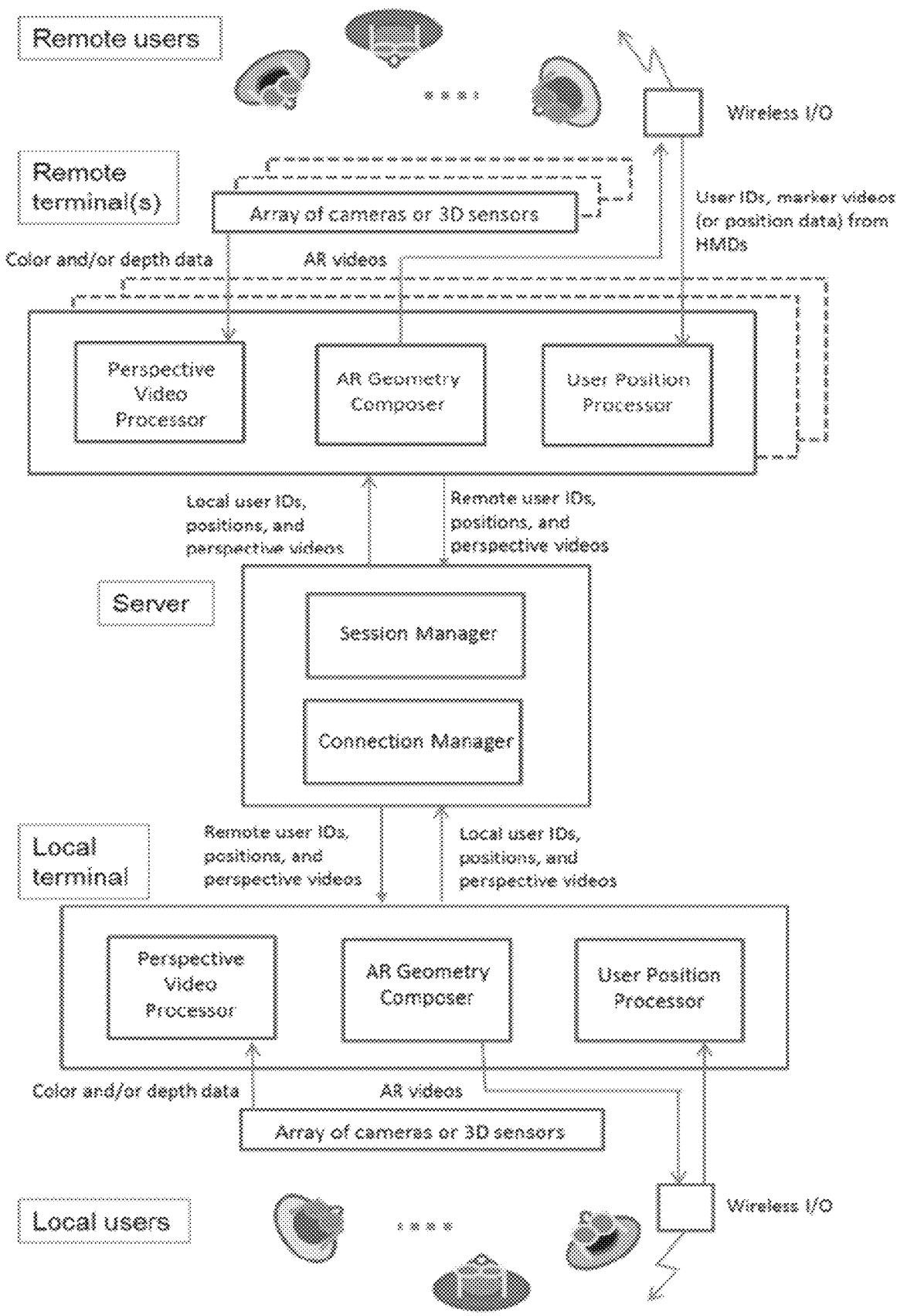
FIG. 11 depicts an example system architecture of a telepresence system, in accordance with at least one embodiment.

In some embodiments, AR Geometry Composer, which is depicted in FIG. 11, calculates each session's geometry according to the number of users and their positions, and stores the session geometry and updates the session geometry when needed (e.g. when users change positions, etc.). Finally, AR Geometry Composer arranges remote perspective videos according to the defined session geometry, and augments remote user videos with respect to visual markers (corresponding cameras or 3D sensors). Using the known session geometry, AR Geometry Composer produces a simple table for mapping incoming and outgoing user videos according to the defined session geometry. The table is stored and updated when needed.

Figure 9:
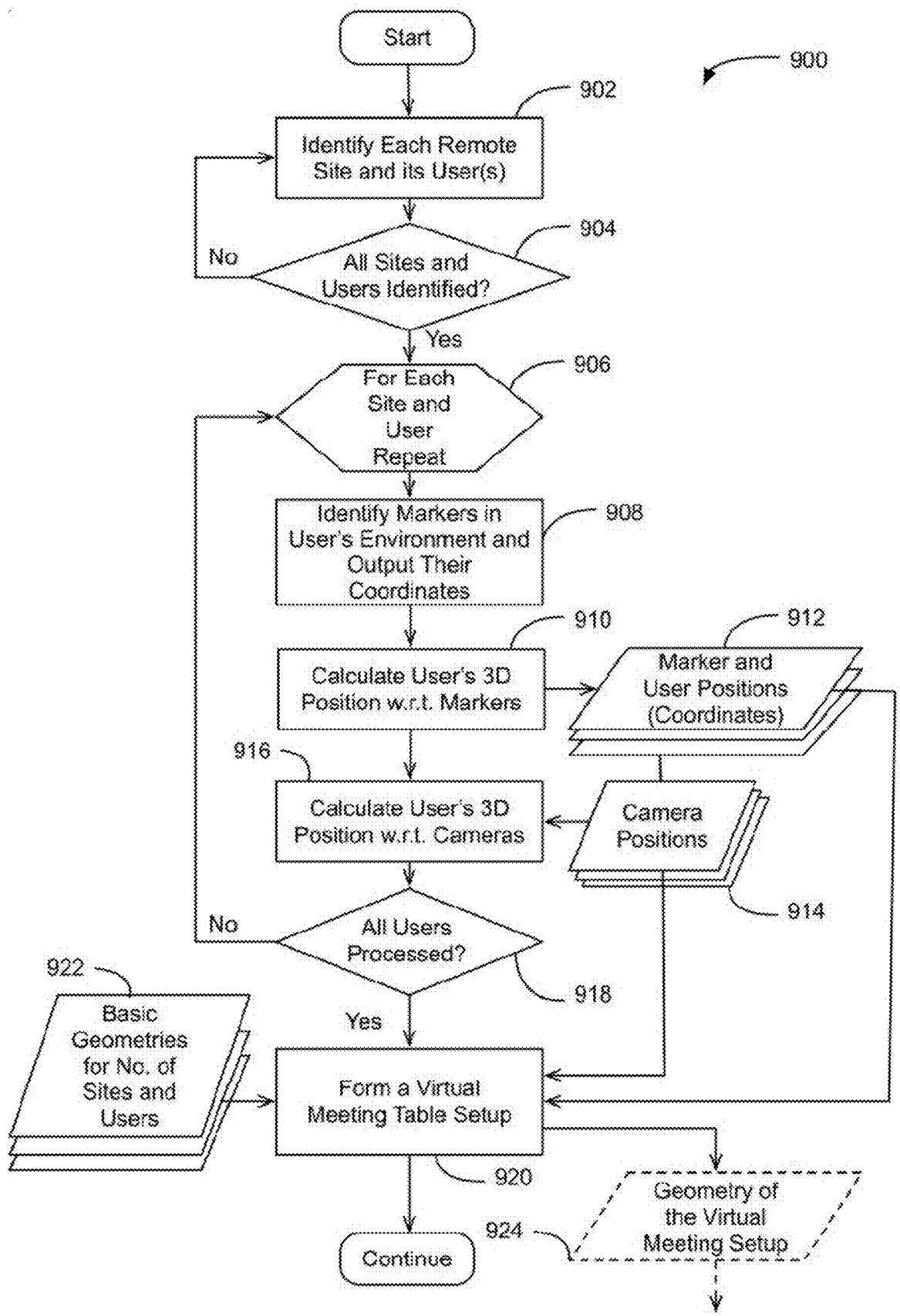
FIG. 9 is a flow chart illustrating a process for defining virtual geometry, in accordance with at least one embodiment.

FIG. 9 depicts a method 900 for defining the geometry for each meeting site (terminal). At block 902, each remote site and the user(s) within the site are identified. If all sites and user(s) are identified at block 904, then for each user at each site, at block 908, markers in users environment are identified and the user's coordinates are output. At block 910, the user's 3D position is calculated with respect to the markers. At block 916, the user's 3D position with respect to the cameras is calculated. After all users have been processed, at block 920 a virtual meeting table is setup based on information pertaining to the basic geometries of the number of sites and users within the sites provided at block 922, camera position information provided at block 914, and marker and user position coordinates provided at block 912. In at least one embodiment, the camera position information pertains to which cameras will be used to support local feeds for each user, and the camera position information is obtained by determining each user's position with respect to the visual markers.

Figure 10:
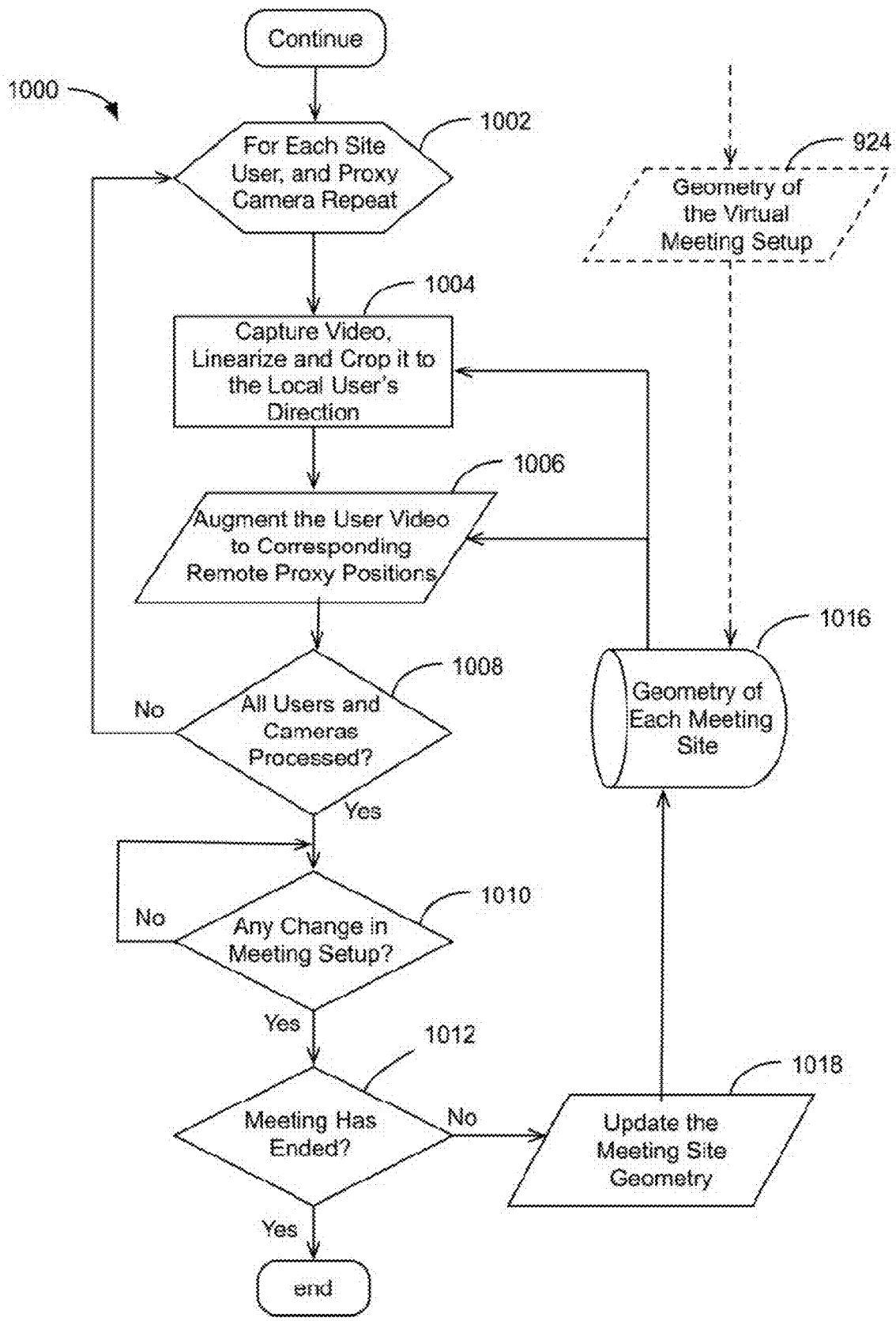
FIG. 10 depicts a process for serving users using the defined meeting geometries in each terminal, in accordance with at least one embodiment.

FIG. 10 depicts process steps of a method 1000 for serving users using the defined meeting geometries in each terminal. Repeating for each user and proxy camera, at step 1004, video is captured, linearized and cropped to the local user's direction based on the geometry of each meeting site provided by block 1016. At step 1006, the user video is augmented to corresponding remote proxy positions based on the geometry of each meeting site provided by block 1016. At step 1008, a check is performed to see if all users and all cameras have been processed. If yes, at step 1010 a check is performed to detect any changes in meeting setup. If the meeting has not ended yet, the meeting site geometry 16 is updated at step 1018.

Viewpoints/Lines-of-Sight Between Participants

In at least one embodiment, after defining the virtual geometry, individual view-points (virtual lines-of-sight) are formed for each participant. In some embodiments, the two cameras nearest to the opposite ends of a virtual line-of-sight act as the opposite two users' eyes, and their video images are augmented for representing the same two users' faces (perhaps after cropping the wide-angle camera views to directions defined by the geometry). In at least one embodiment, videos of each user are captured using an array of wide-angle cameras using knowledge of user positions. In some embodiments, the cropped regions include the users' faces. Calibration and linearization of a wide-angle or fisheye view is not trivial but it is well known, and there are many good solutions as well as e.g. Matlab codes. See, for example, Juho Kannala and Sami S. Brandt (2006), "A generic camera model and calibration method for conventional, wide-angle and fish-eye lenses," IEEE Transactions on Pattern Analysis and Machine Intelligence, vol. 28, no. 8, August 2006 and Scaramuzza, D., Fraundorfer, F. (2011), Visual Odometry: Part I—The First 30 Years and Fundamentals, IEEE Robotics and Automation Magazine, Volume 18, issue 4, 2011. The overall result is a multi-view telepresence system, where each participant has a camera (his/her "remote" eyes) and an augmented video display (their "remote" faces) towards other participants. Using this method of selecting cameras (especially in embodiments with larger camera arrays) provides realistic lines-of-sight between all participants. However, as the AR glasses cover the users' eye-region, the system supports "face awareness" instead of "gaze-awareness" (true eye-contact). True eye-contact can be achieved using highly transparent AR glasses/HMDs or other technique.

In one example, as shown in U.S. Patent Application Publication No. US2010/0115411A1, of a related camera array for a one-way telepresence, virtual real-time dollying or navigation is enabled in a remote physical environment by an array of micro-cameras. Moreover, known technology that can be used for synchronizing or mixing these trails with a virtual model of the same environment.

Note that instead of physical cameras, videos from individual view-points or perspectives can also be formed virtually from real-time captured and reconstructed 3D scenes. An example embodiment discussing this variation is disclosed later. In some embodiments, videos are formed computationally in virtual camera positions (as projections from 3D reconstruction results) using the knowledge on user positions.

In at least one embodiment, the videos of the remote participants are augmented principally on the walls to the point where the lines-of-sight cross them. For neighboring local participants, the remote videos may fall to the same position on the wall. In that case, one camera in that position is used by several participants. Because their viewing angles are different, the cropped video frame contents are however different. In some embodiments, the video of the remote participant is augmented directly on the camera used to provide the local video feed for a particular local participant. As the local participant moves his/her head around, the AR glasses detect the head motion using the head-mounted video cameras (HMCs) to track the visual markers and keep the augmented view of the remote participant centered on the camera. This further reduces the amount of horizontal/vertical parallax in the system.

In some embodiments, the video windows do not need to be augmented on the wall—they can be augmented anywhere along the line-of-sight, provided that the observed frame size (projection) is kept constant—the closer the frame, the smaller its real size. The size is again fully determined by the geometry, and can be computed by the system. As described above, some embodiments project the video windows directly in line-of-sight of the camera used to capture the local video feed of the particular local participant.

In some embodiments, when cropping the video frames (or sub images), the lens distortions of the wide-angle camera views are corrected (e.g. through linearisation of the pillow distortion).

Certain distortions can cause some videoconferencing systems to exhibit a lack of the naturalness of face-to-face meetings. Horizontal distortion stems from the fact that typically one or at most only a few cameras are being used for replacing the eyes of all remote participants in the meeting. Vertical distortion on the other hand stems from the displacement of a camera (remote participant's eyes) from his/her face on the display.

Horizontal distortion is prevented in some embodiments by using a near line-of-sight camera in the array. Vertical distortion is prevented by aligning each remote participant's augmented video in such a way that his/her eyes coincide with a respective camera in the array while looking at a certain remote participant's augmented video.

In some embodiments, the level of the camera array is only approximately at the eye-level of the participants. Even large deviations from this level do not disturb the viewing experience, as the system can track the local participant's real position and keep the augmented incoming video frame and the cropped outgoing camera view always towards the local participant.

In some embodiments, the number of required cameras can be reduced if the supported number of meeting sites and participant positions are fixed to a limited set of options. In some embodiments, the number of cameras in each local meeting site is equal to the minimum number of augmented lines-of-sight required, using one camera for each remote participant. This may require the amount of participants in each meeting to be fixed, and may limit participant motion during the meeting.

Latency

It is evident that many embodiments rely on positioning and tracking of users. Solutions for indoor positioning are accurate and affordable. An exemplary positioning technology is the one used for AR tracking, based on detecting and tracking markers or natural features by HMCs. Another possibility is to track the user(s) by several video or depth cameras in the environment. Various electronic position methods are also an option.

Since embodiments are based on getting perspective videos from specified positions at remote sites, the position information must first be sent to the transmitting side. It is desirable for the two-way transmission (and necessary processing) delays to be comparatively small. This sets requirements both for the network transmission and perspective capture processes.

For example the popular Skype service for audio and video calls illustrates the feasibility of small round-trip delays in IP networks. In one example, described in Yang Xu, Chenguang Yu, Jingjiang Li, Yong Liu, Video Telephony for End-consumers: Measurement Study of Google+, iChat, and Skype. Proceedings of the 2012 ACM conference on Internet measurement conference, Nov. 14-16, 2012, Boston, Mass., USA, the delays experienced in Skype group video calls were measured and were generally found to remain around 230 ms one-way. For more server based solution for Hangouts+ the average delay was 180 ms. It is notable that in good quality conferencing, most of the delays were caused by voice and video processing.

Taking the above results into account, it is feasible to assume that sending (i.e., transmitting, transferring, and the like) user positions does not cause unacceptable delays to the system. Note that this delay slows down system reactions to users' view-point changes (such as moving his/her camera at each far end), and does not mean time shifting the received or transmitted videos. Typically user movements are quite moderate in typical teleconferencing situation, and changing view-point is not likely disturbed by delays in exchanging position data between terminals.

An exemplary system architecture is depicted in FIG. 11. As shown, FIG. 11 includes remote users, remote terminal(s), a server, a local terminal, and local users. In some embodiments, remote terminal(s) include an array of cameras or 3D sensors, wireless I/O, a perspective video processor, an AR Geometry Composer, and User Position Processor. The remote terminal(s) may include any combination of such components, as well as any additional components known to those of skill in the art. The local terminal may take on a form similar to the remote terminal(s).

In at least one embodiment, the array of cameras or 3D sensors captures user videos with an array of video cameras. In another embodiment, the array of cameras or 3D sensors captures a meeting sight with a number of depth sensors (RGB-D or ToF), and forms a real-time 3D model of the meeting sight. In some embodiments, the array of cameras or 3D sensors captures a meeting site with an array of video cameras and forms a real-time 3D model of the meeting site.

In some embodiments, the user position processor derives user positions e.g. by detecting and tracking visual markers from HMC videos. In some embodiments, other methods of deriving positions may be used, such as depth sensors or proximity sensors.

In some embodiments, the perspective video processor crops captured videos by an array of wide-angle cameras using the knowledge of user positions. In some embodiments, videos are formed computationally in virtual camera positions (as projections from 3D reconstruction results) using the knowledge of user positions.

In some embodiments, AR Geometry Composer arranges remote perspective videos according to common session geometry (user IDs and positions) received from the server, i.e. augments user videos with respect to markers (and corresponding cameras or 3D sensors).

In some embodiments, the Session Manager detects users entering and leaving the meeting based on user input or presence detection.

In some embodiments, the Connection Manager connects and disconnects users as they enter or leave the meeting (e.g. using Metcalfe's law).

In some embodiments, Session Geometry Processor and Storage calculates the used geometry according to the number of users and their positions (e.g. using Metcalfe's law). In some embodiments, the session geometry processor outputs a simple table containing all user videos in common virtual geometry coordinates (6 degrees of freedom positions). The output is stored to geometry storage and updated when needed. Table 1 shows an example of a table for storing and delivering virtual meeting geometry (including perspective videos); N is the total number of participants in the meeting; n is the resolution of perspective videos.

TABLE 1

| User ID | Position | Orientation | Perspective video data |
|---------|----------|-------------|------------------------|
| 1 | $x_1, y_1, z_1$ | $\alpha_1, \beta_1, \gamma_1$ | $X_1 = \{x_{11}, x_{12}, \ldots, x_{1n}\}$ |
| ... | | | |
| N | $x_N, y_N, z_N$ | $\alpha_N, \beta_N, \gamma_N$ | $X_N = \{x_{N1}, x_{N2}, \ldots, x_{Nn}\}$ |

In some embodiments, the server includes a session geometry processor, a session manager, a geometry storage, and connection manager. The server may include any combination of components, as well as any additional components as known to those of skill in the art.

Variations to Basic Augmented Reality Concept

In some embodiments, an optimal geometry (shape of the virtual meeting space) depends on the number of sites and participants. Embodiments may utilize shapes such as a square, or a triangle, but should not be so limited. In other embodiments, a linear array fits also for being assembled on a wall. Especially if the camera frame is hung to free space, a more feasible option for the shape is an arc, or a break-line (a polygon).

In some embodiments, the markers can be natural images instead of graphical patterns, e.g. pictures on the wall. In some embodiments, the markers or the camera array need not necessarily be assembled on the wall, but can optionally hang from the ceiling or stand on the floor, the latter even in a wheeled or otherwise mobile frame that can be positioned in front of a sitting group. In some embodiments either some or all of the markers used can optionally be put on the table. In addition to anchoring the remote parties' views, table markers can then be used to augment 3D objects on the table for collaborative viewing.

In some embodiments, it was assumed that HMCs locate the users with respect to markers, each-other, and proxy cameras (remote participants). For the system to work, any feasible positioning method is OK, including those based on tracking users from "outside-in" (e.g. by the proxy cameras) or using other electronic positioning methods.

In some embodiments when cropping the users from the wide-angle camera views, users are segmented from their background e.g. by chroma key techniques (segmentation against a colored background).

One variation is an embodiment that supports stereoscopic 3D. This is possible using the same dense array of cameras used for providing view-points to remote participants. Instead of one camera feeding both HMD displays, a pair of neighboring cameras can be used to provide a stereoscopic view to each remote participant. A natural focal point is the participating person, whose location (actually HMD camera's position) and thus the said focal point, is known by the system. The correct stereo-video with a natural like disparity is cropped from the neighboring wide-angle camera views.

In some embodiments, in addition to the remote videos, the system can augment a shared table in between the participants, or even a more complete virtual meeting space. This is an exemplary way to increase the participants' feeling of being immersed into the same physical space, and e.g. to provide a natural substrate for augmenting 3D objects for collaborative viewing.

In some embodiments of a practical product, the camera array is equipped with the required fiducials or markers for tracking. This simplifies the use of the system by removing the need for camera-marker calibration in the system setup phase. The marker can also be shown on an electronic display, which may itself be integrated with the camera.

There are many possible embodiments for the camera array implementation. In the above description, the array was assumed to be a straight line. However, depending on the main setup geometry being supported, the array in some embodiments can also be an arc, or include fractions of lines in various angles.

Some embodiments may take the form of a system which is not using augmented reality visualization, but (holographic) multi-view displays instead. Due to a special display, such embodiments are however more costly. In addition, the vertical parallax (camera-display) problem is much more difficult to solve. One proposal that involves integrating cameras into display surfaces is described in Matthew Hirsch, Douglas Lanman, Henry Holtzman, Ramesh Raskar (2009). BiDi Screen: A Thin, Depth-Sensing LCD for 3D Interaction using Light Fields. ACM Transactions on Graphics (TOG), Volume 28, Number 5, December 2009.

In some embodiments, the camera array may also be a two or even three dimensional matrix. For example, a two dimensional camera matrix on a wall would provide more natural view-points for users standing and moving around in the meeting space.

As the camera array provides real-time viewpoints from various angles, some embodiments may provide a functionality to the user to change the viewpoint in real-time, without moving him/herself. This way he/she can see the remote meeting sites by the eyes of another user, without affecting his/her own outgoing proxy video. In some embodiments, the camera array could also be used for 3D reconstruction, even in real time when using enough processing power. Several camera views or the reconstruction result can be used for deriving virtual camera positions, thus possibly reducing the number of physical cameras.

Note that a number of possible embodiments are produced by different ways to implement audio transmission between participants, including those supporting multi-channel audio for spatial perception. In general, the capturing and production of audio can apply the same spatial geometry principles as the capturing and production of video.

Embodiments Applying Multi-View Telepresence in Virtual Reality (VR)

Conceptually, a big variation of previously described embodiments is applying the derived virtual meeting geometry in virtual reality (VR), instead of augmented reality (AR).

In VR embodiments, the meeting geometry is derived in the same way as described above in the AR embodiments. As in basic embodiments, in order to define the geometry, user positions need to be derived by some means. Tracking of visual markers by HMD cameras is again one possibility, but also other electronic positioning methods can be used, such as 3-dimensional cameras or proximity sensors, for example. After defining user positions and placing users in the virtual meeting setup, the geometry can be used to show all participants in virtual reality (where each participant is unable to see the real world), instead of augmenting them at each physical meeting room (e.g. as an overlay of the real world).

As in the basic AR based embodiments, users can be captured by video cameras (provided that their HMD or VR glasses do not unduly block their appearances), or more favorably, in some embodiments, they can be shown as animated 3D avatars.

A benefit of implementing multi-view telepresence in VR is that any virtual camera positions can be derived according to the known principles for VR visualization. The shared 3D modeled meeting space can also be chosen freely by the users (or the service provider). The meeting space can basically be any desired, big enough 3D room or space where the users fit in a natural way, rather than being limited by the properties (e.g. size/shape) of each physical meeting room.

In VR embodiments, the challenge and expense of using a lot of physical cameras is replaced by the challenges of first accurately enough modeling each user's avatar, and then capturing the user's motions to animate it. In some embodiments, the VR glasses are configured to capture users' facial expressions, using 3D sensors or cameras for example.

Also in VR based embodiments, users are in principle able to move around, as the system can track their movements and update the geometry respectively. However, users' mobility is in practice more difficult as they are shown the virtual meeting environment instead of their physical room (this is familiar to those who have tested moving with e.g. Oculus Rift glasses).

Also local users need to be captured and visualized in the same way as those remote users. This is a difference compared to the basic AR multi-view system, where HMD cameras can be used directly to show the other local participants.

As for the basic AR based embodiment, both 2D and 3D representations (e.g. stereoscopic 3D) are feasible in VR embodiments. Note that most of the 3D or virtual games are in fact seen using a 2D display.

Variation Using Directional Multi-User 3-Dimensional (3D) Displays

Instead of AR visualization with HMDs or glasses, in some embodiments, hardware displays without the need for AR glasses can be applied. Some embodiments use directional multi-user 3D displays, which typically require detection and tracking of users in order to provide them individual view-points to the content. Multi-user (head) tracking can be either camera and/or sensor based. Some such technologies are described in Rajwinder Singh Brar (2012), "Head Tracked Multi User Autostereoscopic 3D Display Investigations," Ph.D. Thesis, De Montfort University, 2012 and Yi-Pai Huang, "Auto-stereoscopic 3D Display and Its Future Developments," SID seminar, 16 May 2012.

Some embodiments implement directional multi-user display by using multiple head tracking with lenticular autostereoscopic displays (S3D). Holographic or light field displays are examples of high-end solutions. Directional display technologies are becoming cheaper and even large directional displays can be expected to become feasible e.g. in living-room use.

In some embodiments, directional multi-user displays can be either 2D or 3D. 2D displays are more affordable and convey also basic 3D cues (motion parallax).

Figure 12:
FIG. 12 depicts various examples of multi-screen mosaics/tessellations, e.g. for multi-user displays.
Figure 12:
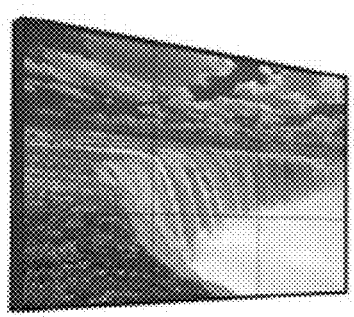
Figure 12:
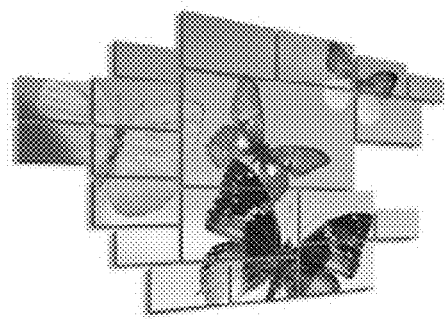

In some embodiments, the implementation of a large directional multi-user display is made favorably by using multi-screen mosaics (see FIG. 12). This is due to the following reasons:

Using multiple displays reduces the cost compared to one large screen.

Multi-screen assembly leaves seams to assemble the required multiple cameras.

Multiple cameras can be used for view-point interpolation providing intermediate view-points, thus reducing the number of physical cameras needed.

View-point interpolation can be used to tackle also the typical camera-display parallax errors disturbing eye-contact.

In some embodiments, the remote users are shown in a 3D modeled VR space, which each local participant can see from his/her own perspective. Embodiments discussed above can therefore also be combined, resulting with an implementation where local physical meeting rooms are extended by a (up to a wall sized) virtual representation.

3D Reconstruction Based Variation to the System Front End

In some embodiments, an array of cameras is used at each meeting site for producing perspective video from each surrogate's (remote participant's) view-point. A first embodiment forms a real-time 3D model of each meeting site with its participants and uses the result for forming required perspective videos computationally from virtual camera positions, instead of getting them from physical video cameras. Apart from the front end for capturing the videos, the system is not otherwise affected by using this option.

In some embodiments, real-time 3D reconstruction can be done by existing 3D depth sensors (sc. RGB-D or Time-of-Flight), for example MS Kinect type of sensors. Various algorithms and implementations have been reported for combining multiple sensors in order to increase accuracy and captured volume. Combining sensors (sensor fusion) can be performed e.g. by applying the Kinect Fusion algorithm by Microsoft, or respective open source implementations in the Point Cloud Library (PCL).

Kinect Fusion has originally been designed for collecting 3D information by a single moving 3D sensor. In order to enable real-time 3D capture, the algorithm has been successfully modified for simultaneous 3D capture and data fusion by several fixed 3D sensors. A real-time solution using five 3D sensors has been implemented e.g. by Andrew Maimone and Henry Fuchs (2012), "Real-Time Volumetric 3D Capture of Room-Sized Scenes for Telepresence," 3DTV Conference: The True Vision—Capture, Transmission and Display of 3D Video, 3DTV-CON 2012, Zurich, Switzerland, Oct. 15-17, 2012. In addition to describing a practical solution for sensor fusion, their paper also describes more generally potentials and challenges encountered when using this approach in telepresence.

In some embodiments, a modified Kinect Fusion algorithm, or the like, enables the formation of required viewpoint videos as 2D projections from the real-time captured 3D model, instead of using the array of physical cameras. In practice, the 3D sensor option represents a new embodiment, where the front end of precisely located video cameras is replaced by a front end of fewer more freely located 3D sensors.

In some embodiments it is also possible to mix both front end options, i.e. camera and 3D sensor based capture in the same telepresence system. The mixture of technologies can be used inside one capture front-end, or different technologies can be used at different meeting sites.

Further Variation Using a Reduced Number of Cameras

In some embodiments, rather than remote participants being set in a natural like configuration augmented in 3D space which extends each local meeting space, remote participants are represented in the local meeting space by augmented surrogates. The meeting space is typically shallower than used in physical meetings, or perceived in the system according to embodiments discussed above. Due to this shallowness, the remote participants are forced in more of a line formation, and their spatial relations are conveyed in less natural way, including the perception of their attention at each moment.

One benefit of these embodiments is that they can be implemented with considerably fewer cameras at each site. The maximum number of cameras is the maximum supported number of remote participants, so it is linearly comparable to the number of all participants (N), instead of N(N−1) like for previously discussed embodiments (with reference to Metcalfe's law). The reduction in number of cameras is gained by compromising the accuracy for perceiving the remote parties eye-direction.

In some embodiments disclosed herein, two or more meeting locations share a commonly understood virtual geometry. In other embodiments, different meeting locations have different local geometries (and different understandings of a global geometry). Both types of embodiments are easy for users to comprehend. Also in earlier discussed embodiments, limiting the system flexibility by assigning fixed (options for) user positions can reduce the number of cameras. That is naturally not desirable, and would also need instructing and showing users the allowed locations within the local meeting site. Also some embodiments combining these two approaches would be possible, but they are less natural and more difficult to reason.

Note that unlike in previously discussed embodiments where there is a shared common geometry, each site has its own geometry for proxies. Local geometry determines to which directions wide-angle camera views must be cropped to get perspective video from each participant. For this reason, there is no need to send data about local user positions to remote sites, and system latency for sending position data is not an issue.

In some embodiments, AR Geometry Composer calculates each local meeting room geometry according to the number of users and their positions, and stores the local geometry and updates the local geometry when needed (e.g. when users change positions, etc.). AR Geometry Composer then allocates remote users to each local meeting room proxy. Finally, AR Geometry Composer arranges remote perspective videos according to the defined local geometry, and augments remote user videos with respect to visual markers (corresponding cameras or 3D sensors). Using the known local geometry, AR Geometry Composer produces a simple table for mapping incoming and outgoing user videos to a local set of proxies. The table is stored and updated when needed.

Figure 13:
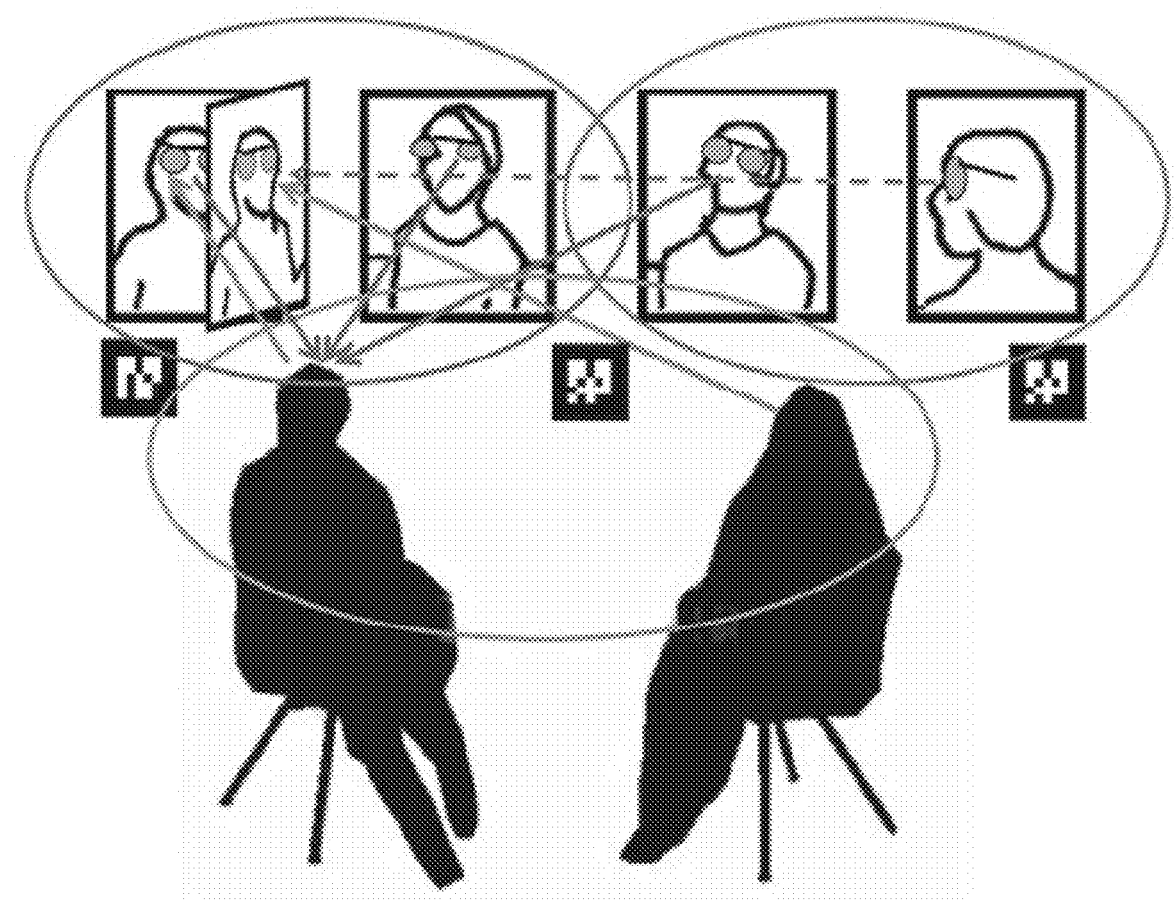
FIG. 13 depicts an example of an AR proxy meeting between three sites from the perspective of two local participants, in accordance with at least one embodiment.

FIG. 13 depicts an example of an AR proxy meeting between three sites (ovals) from the perspective of two local participants (in front), though it is noted that FIG. 13 is a valid representation of earlier embodiments as well. Cameras at each site act as remote participants' eyes. Captured views are augmented on local cameras using the markers and are shown on user's AR glasses. The view-point is different from different positions (an example is shown for the leftmost remote participant seen from two perspectives).

Further Embodiments

Some embodiments may require the need for real eye-contact (gaze awareness instead of "face awareness"). When using AR glasses unobtrusive, small-sized see-through AR glasses are preferred. Some embodiments may use a technique for replicating user's eyes in real-time on the glasses' outer surface, even correctly in 3D.

Some embodiments provide only approximate information of the remote persons' real viewing directions. This happens in the case that proxies are placed independently at each meeting site, which leads to different meeting geometries and user viewpoints across meeting sites, as illustrated in FIG. 3.

Figure 14:
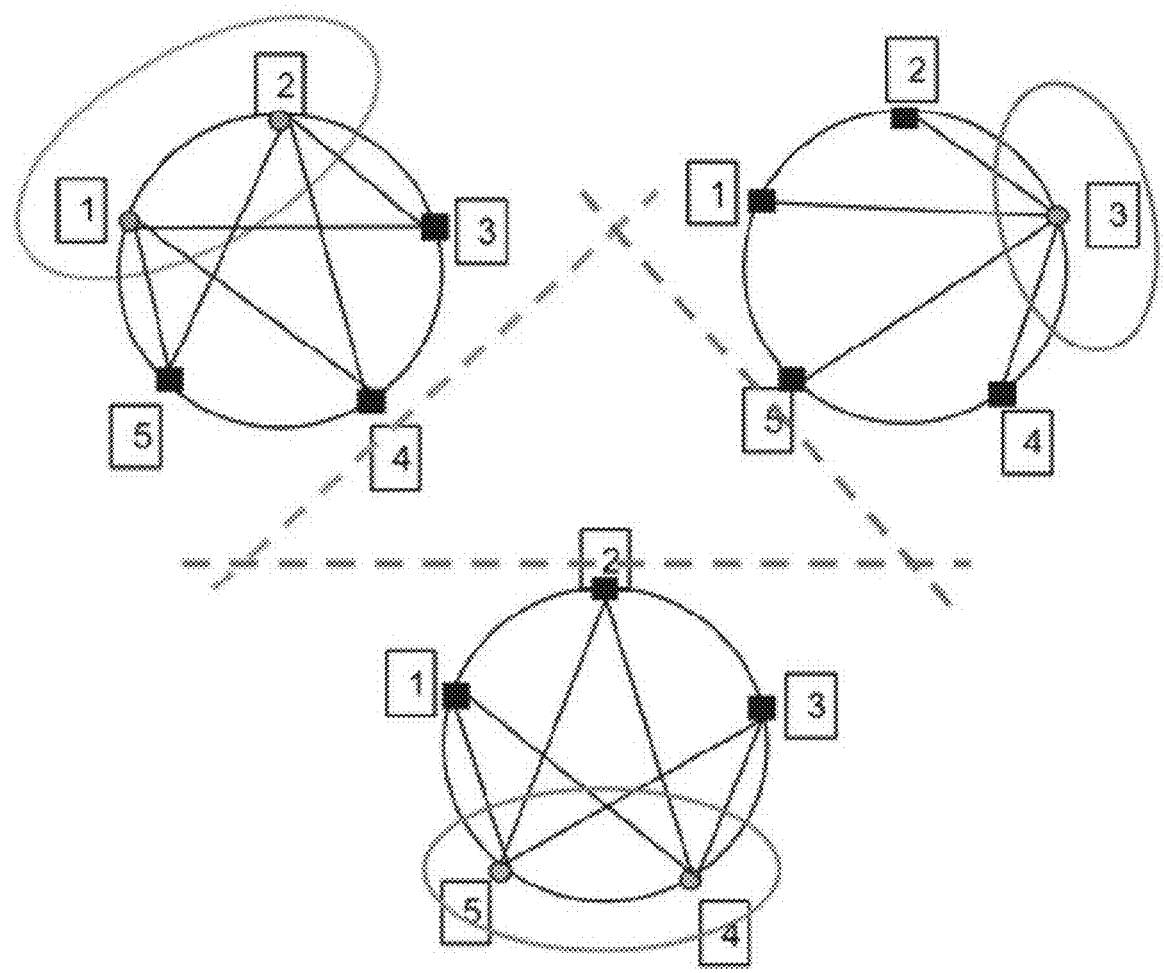
FIG. 14 depicts an example of a proxy-based teleconference with 5 participants at 3 meeting sites, in accordance with at least one embodiment.
Figure 15:
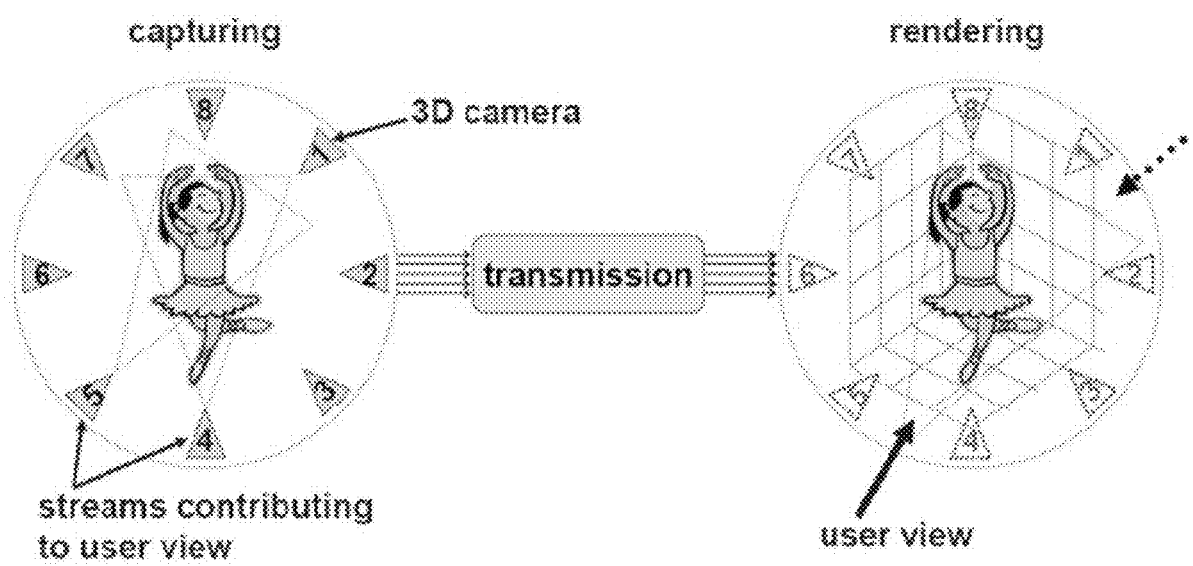
FIG. 15 depicts an example of real-time telepresence using omni-directional 3D capture.

In some embodiments it is possible to have a consistent meeting geometry across meeting sites by requesting the user and proxy positions to be symmetrical and identical across the meeting sites. FIG. 14 illustrates that situation.

FIG. 14 depicts an example of a proxy based teleconference with 5 participants at 3 meeting sites. In this arrangement, the geometry is the same at each meeting site (for used notations, see FIG. 3). In FIG. 14, the perception of spatial and eye-direction are consistent between all participants. However, this embodiment restricts users' freedom of placing themselves, and is also challenged when the number of participants varies (note that in general it can vary even during the meeting). This type of lay-out restriction is true e.g. for the telepresence systems described in 3DPresence (2008), "Specification of Multi-View Acquisition System, v 1.0," Deliverable D1.1, EU-FP7 project 3DPresence, 2008, and in U.S. Pat. No. 7,515,174.

Some embodiments have been described using multiple 3D sensors when forming perspective videos from different view-points. However in some embodiments, 3D sensor fusion introduces also some new potential sources of distortions. Distortions are generated typically due to misscalibration of separate 3D sensors and their color cameras. In addition, due to various objects in the scene may sometimes occlude each other, 3D/color data may be missing in some parts of perspective videos. This may cause visible distortions even after post-filtering or filling operations. These and other distortion problems and their solutions are discussed e.g. in Kannala and Brandt (2006). In spite of their specific challenges, various 3D reconstruction based telepresence solutions are also possible competitors to the disclosed system.

At least one embodiment takes the form of a method and implementation for an immersive multipoint, multi-user 3D telepresence system supporting mobility and free viewpoint selection by the meeting participants. The specified system requires less bandwidth and provides greater flexibility than existing immersive 3D telepresence systems. One such exemplary system has the following features. A large volume, multi-sensor 3D capture and reconstruction is made in real-time at each front-end (site). Multiple perspectives of this 3D reconstruction are derived in real-time, on demand, to each user's direction. User positions are expressed or detected (tracked) accurately within each local site. User positions are defined also with respect to each other, across sites, by defining a common virtual geometry which is consistent despite physical distances and network in between. System and network latency is small enough to send user positions/interactions to each remote site for capturing and receiving requested viewpoint/perspective videos without disturbing delay. User viewpoints are specified either by the system using some feasible positioning method, and/or by manual user interaction.

Immersive telepresence systems based on multi-camera or 3D sensor systems are options to support immersion, e.g. perception of eye-contact, free viewpoints, and spatial interaction. However, increasing the number of cameras and/or 3D sensors produces a lot of data and requires high bandwidth and processing power from the systems. Although both networks and processors are providing increasing performances, innovations are needed to support immersive telepresence cost efficiently.

An immersive telepresence system in accordance with at least one embodiment supports the ability of local viewers to choose their viewpoint to remote views. This is much more demanding than e.g. showing 3D movies in cinema or on TV, where the same 3D perspective is shown for all viewers. For 3D movies it is enough to receive stereoscopic video for viewing with polarizing or shutter glasses. However, a 3D telepresence system in accordance with at least one embodiment may need to support multiple (even moving) users in bi-directional and real-time setting, which is much more demanding.

One potential benefit of immersive telepresence systems is support for changing one's viewpoint. In order to support changing viewpoints, the scene is first captured by a multi-camera or sensor system (or their combination). The number of capturing devices depends basically on the degree of freedom for the users to change their viewpoint to the scene (i.e. to move either physically or virtually).

Multi-sensor capture is typically used for deriving a 3D representation of the captured scene. Novel viewpoints are then synthesized using the 3D representation. Technology that can be used for the synthesis of 3D viewpoints is described in, for example, C. Kuster, T. Popa, C. Zach, C. Gotsman, M. Gross (2011), "FreeCam: A Hybrid Camera System for Interactive Free-Viewpoint Video," Proceedings of Vision, Modeling, and Visualization (VMV) (Berlin, Germany, Oct. 4-6, 2011), pp. 17-24 and Maimone and Fuchs, both of which are implemented using Kinect systems. Systems that generate 3D representations, however, are accompanied by high-bandwidth data requirements for transmission of that data to remote locations. For example, raw data bitrate of Kinect 1 sensor is almost 300 MB/s (9.83 MB per frame). The amount of real-time captured depth sensor data (color plus depth) can be considered clearly bigger than that of a video camera. The same holds also for multi-sensor systems, compared to multi-camera systems.

Other technologies that can be used for 3D capture and reconstruction include those described in U.S. Pat. Nos. 8,872,817 and 8,134,556.

Transmission of 3D Scenes

Transmitting a 3D scene produces a lot of information, and a lot of research has been conducted on data formats and compression methods for reducing the amount of information without unduly sacrificing reconstruction quality. See, for example, Ying Chen and Anthony Vetro (2014), "Next-generation 3d formats with depth map support," IEEE MultiMedia, Vol. 21, no. 2, pp. 90-94, April 2014. Traditionally these algorithms have been developed for the coding of correlating multi-view videos captured by multiple cameras, together with calculated or measured depth information (range data). This enables reconstructing virtual views from various viewpoints when forming the 3D scene in the receiving side.

Wide-range 3D immersion is supported by multi-camera capture, and especially recently by applying one or multiple 3D sensors (sc. RGB-D or Time-of-Flight (ToF)). Coding methods for this type of large volume 3D data are still under development. Technology that can be used for defining, coding and transmitting 3D geometry and texture data is described in, for example, U.S. Patent Application No. 2013/0321593 (Dec. 5, 2013).

Bitrates for 3D Scenes and Video

The following analysis investigates the potential bitrate savings when—instead of 3D data streaming—perspective videos are used for the transmission.

Good coding methods for video exist and bitrates are manageable in many video related applications, including transmission of 3D content. These methods are generally used in coding of 3D movies or videos. One difference between existing 3D media applications and immersive (free viewpoint) telepresence is that much larger capture volumes and viewpoint flexibility are required for the latter.

For 3D telepresence systems, reported bitrates vary considerably depending on capture volume and viewpoint flexibility. It is however possible to state some asymptotic properties relating the usage of bits. A basic rule of thumb which applies to both (RGB) video and depth sensor (RGB-D) data is that bitrates are quite linearly proportional to used capture resolutions (pixels) and framerates. So as a rule of thumb, doubling the resolution or framerate nearly doubles the amount of produced bits. However, increasing resolution or framerate usually shows some relative benefit due to increased spatial or temporal correlation between pixels.

An important starting point or boundary condition is the basic characteristic of a visual scene. The amount of bits needed to describe the scene is an intrinsic property of the scene. For example, it can be assumed that the scene can be described by $N_V$ bits/s using a modern efficient video compression method. The fact that a 3D sensor (e.g. an RGB-D camera) is used does not practically change this need. For an efficient compression method for RGB-D, a good estimate for the amount of information is $N_D \geq N_V$ (here subscript V refers to video and D for depth sensor)

The above is due to the fact that in addition to normal video data, an RGB-D camera produces also information relating the depth of each image pixel. The increase of bitrate it causes may be partly compensated by coding of color/texture data together with depth information (sc. joint coding). An example of this type of joint coding is given in Jingjing Fu, Dan Miao, Weiren Yu, Shiqi Wang, Yan Lu, and Shipeng Li (2013), Kinect-Like Depth Data Compression, IEEE Trans. on Multimedia, Vol. 15, No. 6, October 2013, p. 1340-1352, where RGB-D data produced by one Kinect is compressed in average to about 200 kbit/frame with 60 dB PSNR.

Even with a sophisticated compression algorithm, the number of bits produced by an RGB-D camera is greater than that of a video (RGB) camera. For example, in Filippo Bannà, Paolo Simone Gasparello, Franco Tecchia, Massimo Bergamasco (2012), Real-Time Compression of Depth Streams through Meshification and Valence-Based Encoding, VRCAI 2012, Singapore, Dec. 2-4, 2012, pp. 263-270, the compressed bitrate for the depth data from two Kinect sensors at 30 fps (using the "meshification" of the fused depth map) was in the order of 0.5-1.5 Mbit/s (PSNR for the depth data being between 40-45 dB), the same order as for one typical compressed video.

Compared to a video camera, a big benefit of a depth camera is the format of its data, which is rather directly applicable for 3D viewing. Direct capture of depth data also saves substantial processing power compared to deriving depth from multiple-view videos. Thanks to actively projecting (IR) features to the environment, these sensors are generally less sensitive e.g. to the lack of visual features, which may be a problem when deriving depth from video views. However, depth sensors have their own sources of distortion (limitations for quality), and challenges relating e.g. calibration and fusion.

On the other hand, when using multiple (n) video cameras picturing about the same scene, the asymptotical total bitrate corresponds to $B_V > < n \times N_V$ For n RGB-D cameras, the total bitrate is respectively $B_D > < n \times N_D$ When capturing the same volume by a number of sensors, their data has similarity (redundancy) which can be reduced by a suitable compression method. So in practice, the total bitrate of n sensors is less than n fold to one sensor.

In R. Mekuria, M. Sanna, E. lzquierdo, D. Bulterman, and P. Cesar (2014), "Enabling 3D Tele-Immersion with Live Reconstructed Mesh Geometry with Fast Mesh Compression and Linear Rateless Coding," Multimedia, IEEE Transactions on, vol. PP, no. 99, 2014, a compression method for Kinect data was described, giving the following results for segmented and meshified human upper torso videos (Table 2). Table 2 shows bitrates for 3D compressed head and shoulders views captured by Kinect cameras.

TABLE 2

| — | 5 fps | 8 fps | 10 fps | 12 fps |
|---|---|---|---|---|
| 1 Camera | 14.8 Mbit | 23 Mbit | 29.6 Mbit | 35.52 Mbit |
| 5 Camera | 58 Mbit | 93 Mbit | 116 Mbit | 134 Mbit |

Using the deductions above, for example the bitrate for five sensors captured at 30 fps can be estimated to be about 300 Mbit/s.

As a summary, for 3D capture in telepresence, the total amount of bits generally corresponds directly to the number of capture devices, and is in practice quite independent of the capturing technology.

Combining Meeting Site Geometries and Tracking User Position

In 3D telepresence systems, the usual objective is to transmit all captured information to the receiving side in order to reconstruct the whole captured 3D scene. This is generally necessary if the viewer's viewpoint in the receiving side can vary freely, and is not known at each time instant. This is also necessary in case of multiple viewers, in random positions, who need to see the view from different angles at the same time.

Exemplary technology that can be used to provide 3D sensor based capture, unified consistent geometries and 3D rendering across sites, and user head tracking is described in Cha Zhang, Qin Cai, Philip A. Chou, Zhengyou Zhang, Ricardo Martin-Brualla (2013), "Viewport: A Distributed, Immersive Teleconferencing System with Infrared Dot Pattern," IEEE Multimedia, vol. 20, no. 1, pp. 17-27, January-March 2013, pp. 17-27, with reference to a telepresence system called ViewPort.

Figure 16:
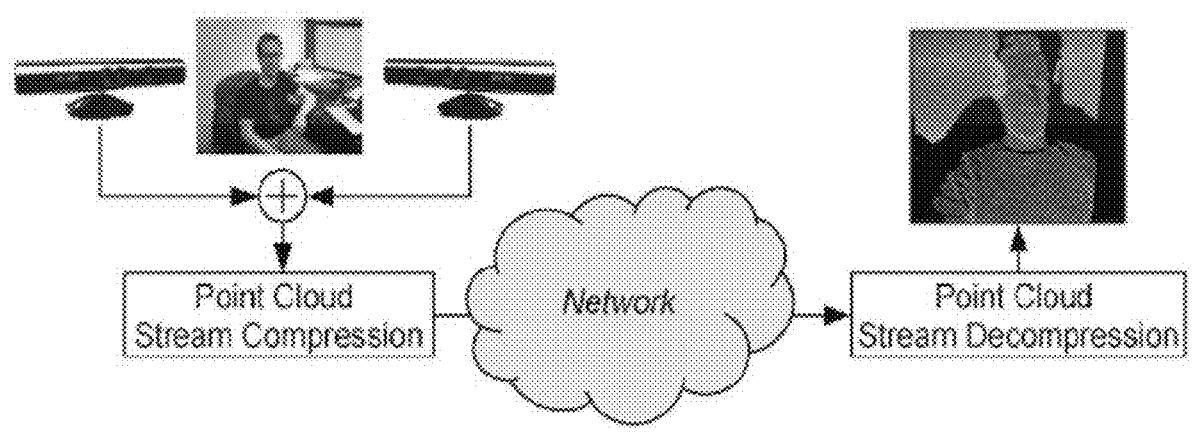
FIG. 16 depicts a typical 3D telepresence situation with a system using multiple 3D sensors to capture a remote scene.

FIG. 16 depicts a 3D telepresence system using multiple 3D sensors (e.g. Kinects) to capture a remote scene. Generally, the more capturing devices are used, the more complete the captured 3D point cloud is, and the less it has undetected areas ("holes" shown black in the image). Unfortunately, the completeness comes at the cost of higher bitrates, as discussed earlier.

Figure 17:
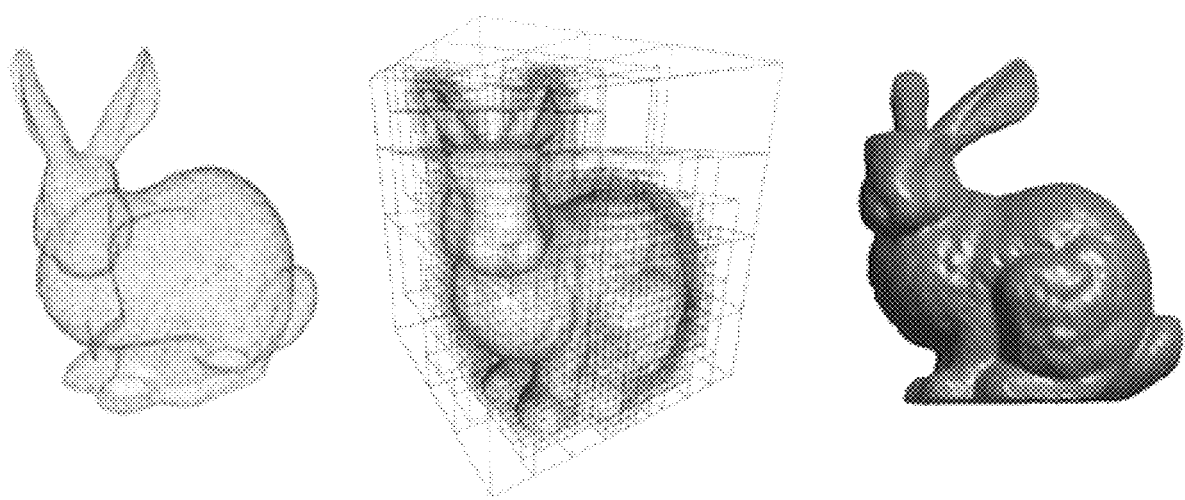
FIG. 17 depicts an embodiment where the multi-sensor captured 3D point-cloud is filtered, segmented, coded, and sent to the receiving side to be fitted with a surface and texture.

In one embodiment, along the pipeline depicted above in FIG. 16, the multi-sensor captured (wide range or even omni-directional) 3D point-cloud is filtered, segmented, coded, and sent to the receiving side to be fitted with a surface and texture, as depicted in FIG. 17.

In the schematic process description of FIG. 17, the 3D captured point-cloud (shown on the left) has been encoded and transmitted in an octree representation (shown in the middle), although in practice is seen by a user from one perspective at a time (an example of which is shown on the right; after decoding, surface fitting, texturing, etc.).

In accordance with at least one embodiment of a freeview telepresence system using 3D data capture, instead of using real-time 3D data transmission, lower bitrate video transmission can be used, provided that the system is: tracking and showing users in a unified virtual geometry across meeting sites; bringing the local users real-time perspectives to remote sites and participants, on an on-demand basis, so that perspective videos meet the defined virtual geometry; and showing low round-trip delay to serve on-demand requests for viewpoint changes with small latency.

Deriving a unified virtual geometry, based on user positioning, enables setting remote participants in a real-world like spatial arrangement which supports individual viewpoints and e.g. eye-contact. The use of perspective videos in transmission—even when using 3D reconstruction for user capture—offers simpler implementation and savings in bitrate, shown here by analyzing related studies. Small round-trip delay is here relevant as, generally speaking, new telepresence systems quite often support functionalities based on interactions between receiver and transmitter (e.g. data exchange for on-demand perspectives based on user motions and/or manual interactions).

Exemplary technology that can be used to enable 3D telepresence is described by Zhengyu Yang, Wanmin Wu, Klara Nahrstedt, Gregorij Kurillo, and Ruzena Bajcsy (2010), Enabling Multi-party 3D Tele-immersive Environments with ViewCast, ACM Transactions on Multimedia Computing, Communications and Applications, Vol. 6, No. 2, March 2010, pp. 111-139, which makes use of up to 10 surrounding 3D capturing devices/processes per meeting site. The actual amount of information may thus be in the order of ten times the bitrate for one captured stream. As described in Zhengyu Yang et al., the 3D streams that are most likely to be needed are proactively coded and transferred to specific service gateways for delivery (if needed). This way, the average number of required 3D streams is reduced down between two or three.

In some embodiments, user's viewpoint is tracked accurately by suitable positioning method(s), so that at each moment only a (stereoscopic) video perspective is needed from the real-time captured 3D scene. This approach reduces the required amount of information more than that of Yang et. al. The solution becomes much simpler, and the transmission of visual views (perspectives) can even rely on well-known video coding and transmission methods.

In exemplary embodiments, a unified geometrical relation is defined between all meeting sites and participants. One user interaction for defining the viewpoint thus affects the unified 3D representation or all sub-views at the same time. Such embodiments differentiate from alternatives in which a user defines the desired viewpoint to all remote scenes, so that a separate mouse interaction or the like is made for each of the remote views due to the absence of a fixed geometrical relation: one definition of a viewpoint does not define the viewpoint to other views.

The basic observation is that in order to provide 3D immersion, not all 3D information captured in the transmitting side need to be sent to the receiving side. At each time instant, enough information to be sent is just the amount required for the particular position of a viewer or several viewers. The data is in this way ordered on an on-demand basis, the demand being defined primarily by the users momentary position.

An important prerequisite for related embodiments is thus positioning and tracking of users. Solutions for indoor positioning are more and more accurate and affordable. An exemplary positioning technology is the one used for AR tracking, based on detecting and tracking makers or natural features by head mounted video cameras. Another possibility is to track the user(s) by several video or depth cameras in the environment. Various electronic position methods are also an option. Technology that can be used for camera-based tracking and positioning is that described by, for example, in Scaramuzza, D., Fraundorfer, F. (2011), Visual Odometry: Part I—The First 30 Years and Fundamentals, IEEE Robotics and Automation Magazine, Volume 18, issue 4, 2011 and Fraundorfer, F., Scaramuzza, D. (2012), Visual Odometry: Part II—Matching, Robustness, and Applications, IEEE Robotics and Automation Magazine, Volume 19, issue 2, 2012.

Another essential prerequisite for some embodiments is that all users and sites are expected to have a known common geometry between each other. This geometry is defined in some appropriate way by the system, and is made consistent despite physical distances and network in between. An exemplary procedure for defining such virtual geometry is given above.

In some embodiments, perspective videos may be requested on-demand from the specified viewing positions. Therefore, the position information must first be sent to the transmitting side. Another characteristic of some embodiments is that the two-way transmission (and necessary processing) delays are altogether small. This sets requirements both for the network transmission and perspective capture processes. Note that this delay may slow down system reactions to users' viewpoint changes (e.g. moving his/her camera at each far end), and does not mean delays in received or transmitted videos. In many cases, user movements are quite moderate in a typical teleconferencing situation.

For example the popular Skype service for audio and video calls is a good demonstration of round-trip delays being small enough in IP networks. In the paper by Yang Xu et. al, the delays experienced in Skype group video calls were measured and were generally found to remain around 230 ms one-way. For more server based solution for Hangouts+ the average delay was 180 ms. It is notable that in good quality conferencing, most of the delays were caused by voice and video processing. In the disclosed system, the critical round-trip delay includes sending user position data to the remote end (uplink), changing the viewpoint for the perspective video, and streaming the video (and audio) downlink. In some embodiments, due to the relatively small amount of position data sent uplink, the uplink delay contributes less to the critical round-trip delay than in the above referred more symmetrical case.

Note that the above-described delays in interaction do not occur in typical teleconferencing systems, where the received content (viewpoint) is not changed according to user motions. Round-trip delays become relevant in telepresence systems supporting interactions between receiver and transmitter, e.g. for individual viewpoints and eye contact.

As in normal video applications, in most cases, 2D or stereoscopic 3D (sc. S3D) display is sufficient to show on-demand perspectives. Compared to existing solutions based on 3D transmission, some embodiments may reduce bitrate by using 2D or S3D videos, provided that user positions are known at each moment. When the position changes new 2D video or S3D information is sent.

In some embodiments, instead of sending all 3D captured data to other meeting sites, only the (stereoscopic) videos supporting each detected viewpoint are sent. Characteristics of at least one embodiment are the following. Wide, multi sensor 3D capture and reconstruction can be made in real-time at each front-end (site). Multiple perspectives of this 3D reconstruction can also be made in real-time, on demand, to each user's direction. User positions are expressed or detected accurately within each local site. User positions are defined also with respect to each other, across sites, by defining a common virtual geometry which is consistent despite physical distances and network in between. System and network latency is small enough to send user positions/interactions to each remote site for capturing and receiving requested viewpoint/perspective videos without disturbing delay.

Figure 18:
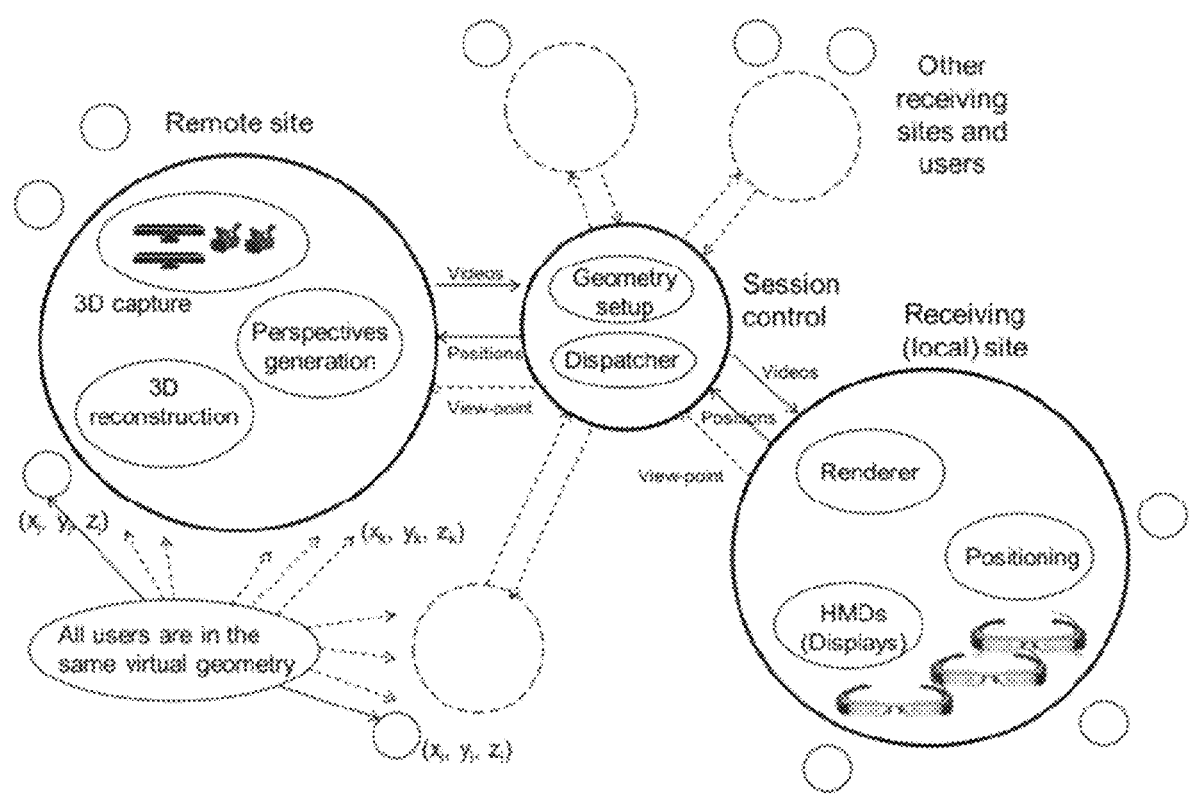
FIG. 18 depicts a simplified schema of a free-viewpoint telepresence system using on-demand perspectives, in accordance with at least one embodiment.

In some embodiments, all sites are set to a common geometry, and even rendered to a unified 3D representation (e.g. virtual or augmented reality view). This means that a users interaction for defining the viewpoint affects the unified representation, and thus to all its sub-views at the same time. In some embodiments, this user interaction can naturally be manual mouse interaction, but in other embodiments, it may be dependent on computer based (indoor) positioning of the user. In further embodiments, the positioning is here assumed to be done for all users at each meeting site, and an individual perspective to the unified 3D representation can be shown to each of them. This individual view can be brought to each user using a HMD or optionally a directional multiple view 3D display. FIG. 18 is a schematic diagram of the free viewpoint telepresence system using on demand perspectives, in accordance with at least one embodiment.

In FIG. 18, one remote site is shown transmitting and one local site receiving the required perspectives. In reality, each site contains all remote and local components, such that the architecture and communication is bidirectional and symmetrical between all sites. In some embodiments, a centralised dispatcher is shown to be used for communication, but it can also be implemented peer-to-peer in other embodiments.

In variations of the method manual definition of the viewpoint can be used in addition to (or as an alternative to) user positioning. In the simplified schema in FIG. 18, these variations are 'served' by the dashed 'viewpoint' arrays beside the 'positions' data.

Figure 19:
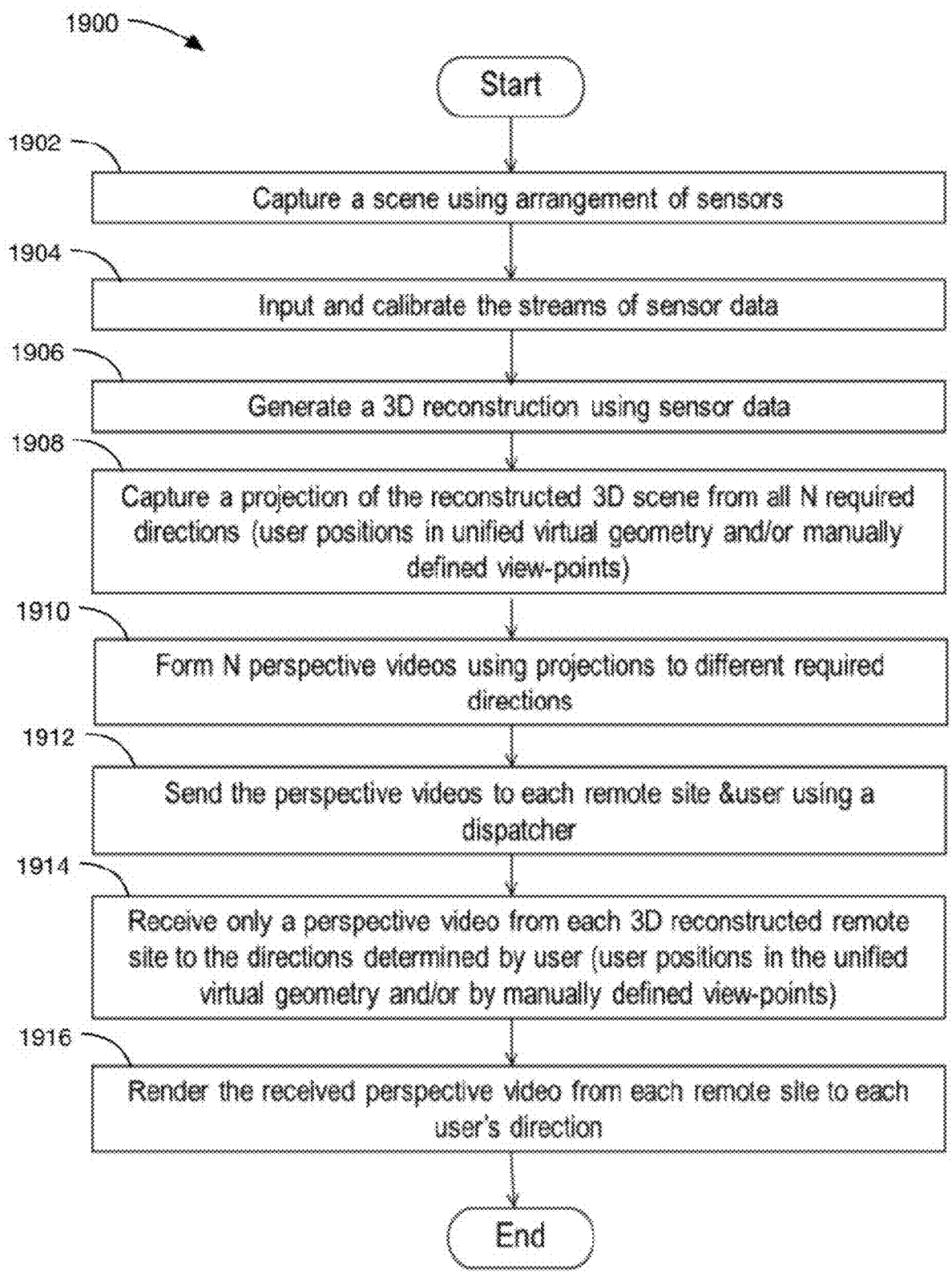
FIG. 19 depicts a method for forming and dispatching perspective video, in accordance with at least one embodiment.

FIG. 19 depicts a method 1900 for forming and dispatching the required perspective video, the method comprising the steps of capturing, at step 1902, a scene using an arrangement of sensors, inputting and calibrating, at step 1904, the streams of sensor data, generating, at step 1906, a 3D reconstruction using sensor data, capturing, at step 1908, a projection of the reconstructed 3D scene from all N required directions (user positions in unified virtual geometry and/or manually defined view-points), forming, at step 1910, N perspective videos using projections to different required directions, sending, at step 1912, the perspective videos to each remote site and user using a dispatcher, receiving, at step 1914, only a perspective video from each 3D reconstructed remote site to the directions determined by user (user positions in the unified virtual geometry and/or by manually defined view-points), and rendering, at step 1916, the received perspective video from each remote site to each users direction.

Figure 20:
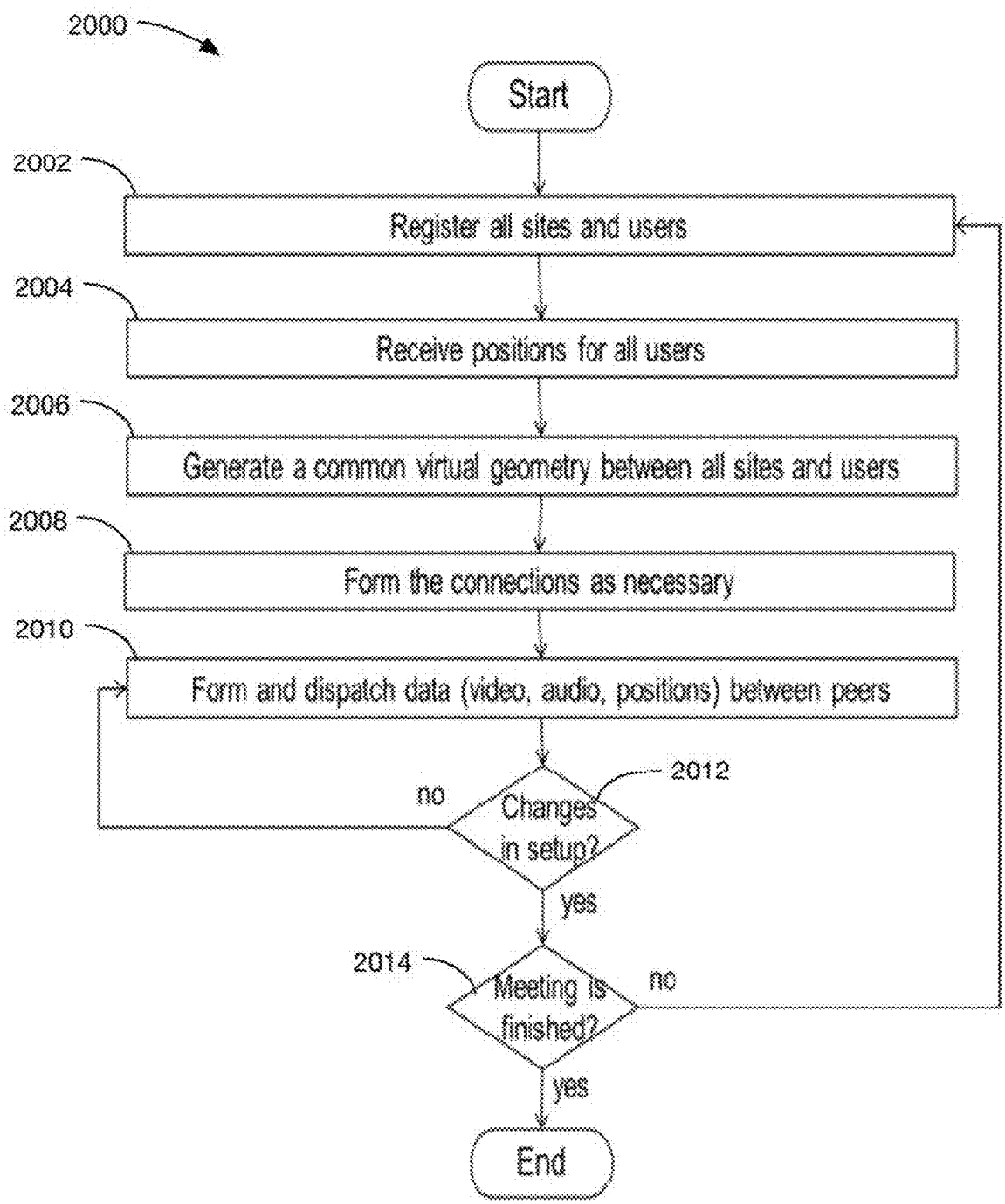
FIG. 20 is a flow chart of a method for a telepresence session, in accordance with at least one embodiment.

FIG. 20 depicts a simplified flow chart of a method 2000 for a telepresence session, in accordance with at least one embodiment. As shown, method 2000 includes the steps registering, at step 2002, all sites and users, receiving, at step 2004, positions for all users, generating, at step 2006, a common virtual geometry between all sites and users, forming, at step 2008, the connections as necessary, forming and dispatching, at step 2010, data (video, audio, positions) between peers, detecting, at step 2012, changes in setup, and detecting, at step 2014, if the meeting has finished.

In some embodiments, the front-end is based on a camera array, which is able to give about any required viewpoint directly as a video. However in alternate embodiments, instead of cameras, 3D imaging (e.g. camera, 3D sensor, or hybrid based) can be used for real-time 3D reconstruction in the front-end.

In some embodiments, user views are transmitted on demand in (stereoscopic) video form. Compared to the existing studies, this approach is shown to bring considerable savings in bitrate, and to simplify the implementation so that quite conventional ways of multipoint (p2p) video transmission and compression can be used in the implementation of the new system.

In some embodiments, all users and sites have a known common geometry between each other. Apart from the local geometry at each meeting site, this geometry is virtual (due to network connections between sites), and is defined in some appropriate way by the system.

In some embodiments users are positioned by a suitable positioning method. In some embodiments, primary means for positioning is based on Augmented Reality tracking, as AR was primarily used for the visualization. Any other suitable positioning method can however be used, especially if the local rendering of remote users is done using directional 3D displays instead of ARNR glasses picturing AR markers with a camera.

In some embodiments, using a common virtual geometry where all users are placed and tracked by their position simplifies user interaction, as a user's movements straightforwardly define the rendering of the compiled meeting setup for all participants. Thus, a user does not need to specify his/her viewpoint separately in multiple 3D views.

For simplicity, instead of a compiled 3D arrangement, in some embodiments remote sites can also be rendered in a tiled or matrix fashion. This naturally reduces the impression of sharing the same physical meeting space. However, due to the underlying unified virtual geometry, each interaction to change the viewpoint can be reflected to all sub-views.

Separation of Physical Position and On-Demand Viewpoint

In addition to more general embodiments presented earlier, a new idea for the differentiation of user position and viewpoint request is suggested. It leads to three new embodiments of the system as described in the following.

Variation Supporting Both Manual and Motion Based Viewpoint Changes

In some embodiments, a user wants to keep his/her physical position (so as not to affect the captured views received by other parties), but still wants to see his/her counterparts from a different viewpoint. Some embodiments allow serving users with an option to fly around in the unified meeting geometry without affecting the views seen by the remote participants.

The above interaction functionality requires some additional technical support from the system. Tracking user positions alone is not enough, as in addition, the client user interface allows the user to define his/her preferred viewpoint and hand it over to be delivered by the system. Tracked user positions may still be used when defining the unified virtual meeting geometry. The unified meeting setup is shown to other users using this definition. Despite of the defined geometry, the user is now however able to define also his/her individual viewpoint manually. Due to this new functionality, the user is able to move virtually, without doing it physically. For other users this interaction is not directly visible, as the manual interaction does not affect the unified meeting geometry. The new functionality can be used just for fun, in distant learning applications (for example for dancing, martial arts, or other sports), and for more industrial applications such as remote guidance. The new functionality also allows viewing of the virtual meeting setup with properly aligned perspective videos from any new viewpoint. These viewing and interaction paradigms (including UI) are very much the same as e.g. when changing one's viewpoint in interactive 3D games.

Embodiment Supporting Only Manual Viewpoint Changes

In some embodiments, the only way of viewing the content is to see the unified virtual meeting setup from manually defined viewpoints. Also in this case, user positioning is used for defining a consistent virtual geometry for the setup, but local viewpoints are not rendered from these positions. However, this approach means giving up from mimicking physical meeting experience, including e.g. detecting eye-contact in a natural way. In some embodiments, both user positions for the meeting setup and user viewpoints are given manually, so that user positioning or tracking by the system is not needed.

Embodiment Defining the Unified Virtual Geometry by Request

In some embodiments, deriving the unified virtual geometry is not done in real-time, especially in cases that manual user interaction is used for defining the user position and/or viewpoint. The requirement for processing power of the system can be reduced respectively. For example if the participants have a regular meeting in basically the same geometrical setup, a previously-defined user positioning and virtual geometry definition may be used. Update of the geometry may be done by user request or following some specified decision rule.

Discussion

One advantage evident in some embodiments is savings in bitrate when using 3D scene capture (either camera or 3D sensor or hybrid based) for providing different viewpoints in telepresence. Saving in bitrate stems from transmitting only information depending on each user's actual position, and not sending all captured 3D information. When knowing the user's position, it is possible to order, on an on-demand basis, the required perspective or viewpoint to the receiving side.

The described on-demand perspective embodiment is applicable whether the 3D capture front-end is based on using multiple 3D sensors, more traditional 3D capture by multiple cameras, or a dense array of optical cameras (directly providing required 2D viewpoint). All these options for the front-end are possible embodiments.

Compared to multi-camera (array or matrix) based embodiments, using 3D sensors reduces the number of capturing devices and provides more flexibility to the device setup.

Perspective video based telepresence embodiments can use existing efficient compression methods for video or stereoscopic 3D. These embodiments can therefore also more easily be designed downward compatible to accept AV streams from standard teleconferencing equipment.

Exemplary embodiments described herein provide a flexible free-viewpoint telepresence between multiple sites with several persons per site.

In some embodiments, where the system turns 3D captured scenes into perspective videos for delivery, the transmission system is simple and even falls back to more conventional videoconferencing solutions. In typical meeting situations, these embodiments give substantial savings in bitrate, which can be turned into savings in costs or increase in quality.

Exemplary embodiments operate to obtain information about users' positions and to send that information to a server or the remote sites.

In some embodiments, the users are bound in a common virtual geometry with regard to each other, and viewpoint changes are supported based on user interaction. Even if the remote sites are chosen to be represented in a traditional tiled or matrix arrangement in the user's view, his/her change of viewpoint will affect them all at the same time.

In some embodiments, the procedure of separately coding and transmitting on-demand perspective videos is favorable up to some maximum number of meeting participants per site, after which sending the whole 3D scene becomes more economical. This is due to that, with many perspective videos per site, compressing them separately is less efficient than joint coding of the entire 3D information. The latter means that jointly optimized compression is made for the data from all capture devices (multiple depth sensors or video cameras). For a system with one or few participants at each multiple meeting sites, even the separate coding and transmission of perspective videos remains a better option over the full 3D transmission. Note that also multiple correlating perspective videos can be compressed jointly using existing video coding standards, as described in Chen and Vetro.

Exemplary embodiments implement user positioning using AR tracking. AR tracking is a particularly useful in embodiments where HMDs (for either AR or VR visualization) are chosen to be used as the user display.

Some embodiments allow serving users with an option to fly around in the shared meeting geometry without affecting the views (geometry) seen by the remote participants, as well as enable saving of processing power.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Exemplary embodiments disclosed herein are implemented using one or more wired and/or wireless network nodes, such as a wireless transmit/receive unit (WTRU) or other network entity.

Figure 21:
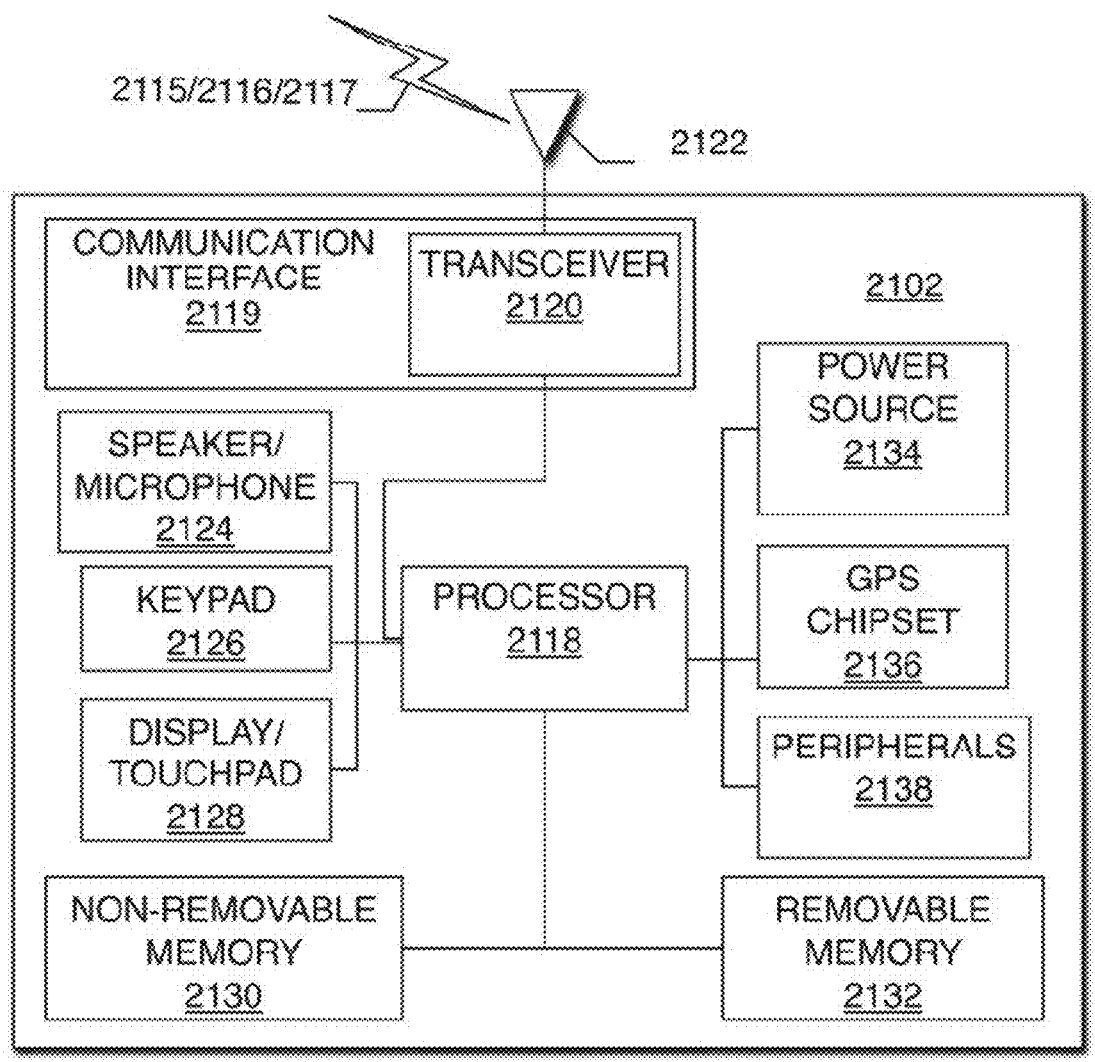
FIG. 21 illustrates an exemplary wireless transmit/receive unit (WTRU) that may be employed as a client device in some embodiments.

FIG. 21 is a system diagram of an exemplary WTRU 2102, which may be employed as a client device in embodiments described herein. In some embodiments, a client device could take the form of an augmented reality (AR) headset, a virtual reality (VR) headset, multi-user 3D display, a smart-TV, or any other device known to one of skill in the art. As shown in FIG. 21, the WTRU 2102 may include a processor 2118, a communication interface 2119 including a transceiver 2120, a transmit/receive element 2122, a speaker/microphone 2124, a keypad 2126, a display/touchpad 2128, a non-removable memory 2130, a removable memory 2132, a power source 2134, a global positioning system (GPS) chipset 2136, and sensors 2138. It will be appreciated that the WTRU 2102 may include any subcombination of the foregoing elements while remaining consistent with an embodiment.

The processor 2118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 2118 may perform signal coding, data processing, power control, input/output processing, and/or any other functionality that enables the WTRU 2102 to operate in a wireless environment. The processor 2118 may be coupled to the transceiver 2120, which may be coupled to the transmit/receive element 2122. While FIG. 21 depicts the processor 2118 and the transceiver 120 as separate components, it will be appreciated that the processor 2118 and the transceiver 2120 may be integrated together in an electronic package or chip.

The transmit/receive element 2122 may be configured to transmit signals to, or receive signals from, a base station over the air interface 2115/2116/2117. For example, in one embodiment, the transmit/receive element 2122 may be an antenna configured to transmit and/or receive RF signals. In another embodiment, the transmit/receive element 2122 may be an emitter/detector configured to transmit and/or receive IR, UV, or visible light signals, as examples. In yet another embodiment, the transmit/receive element 2122 may be configured to transmit and receive both RF and light signals. It will be appreciated that the transmit/receive element 2122 may be configured to transmit and/or receive any combination of wireless signals.

In addition, although the transmit/receive element 2122 is depicted in FIG. 21 as a single element, the WTRU 2102 may include any number of transmit/receive elements 2122. More specifically, the WTRU 2102 may employ MIMO technology. Thus, in one embodiment, the WTRU 2102 may include two or more transmit/receive elements 2122 (e.g., multiple antennas) for transmitting and receiving wireless signals over the air interface 2115/2116/2117.

The transceiver 2120 may be configured to modulate the signals that are to be transmitted by the transmit/receive element 2122 and to demodulate the signals that are received by the transmit/receive element 2122. As noted above, the WTRU 2102 may have multi-mode capabilities. Thus, the transceiver 2120 may include multiple transceivers for enabling the WTRU 2102 to communicate via multiple RATs, such as UTRA and IEEE 802.11, as examples.

The processor 2118 of the WTRU 2102 may be coupled to, and may receive user input data from, the speaker/microphone 2124, the keypad 2126, and/or the display/touchpad 2128 (e.g., a liquid crystal display (LCD) display unit or organic light-emitting diode (OLED) display unit). The processor 2118 may also output user data to the speaker/microphone 2124, the keypad 2126, and/or the display/touchpad 2128. In addition, the processor 2118 may access information from, and store data in, any type of suitable memory, such as the non-removable memory 2130 and/or the removable memory 2132. The non-removable memory 2130 may include random-access memory (RAM), read-only memory (ROM), a hard disk, or any other type of memory storage device. The removable memory 2132 may include a subscriber identity module (SIM) card, a memory stick, a secure digital (SD) memory card, and the like. In other embodiments, the processor 2118 may access information from, and store data in, memory that is not physically located on the WTRU 2102, such as on a server or a home computer (not shown).

The processor 2118 may receive power from the power source 2134, and may be configured to distribute and/or control the power to the other components in the WTRU 2102. The power source 2134 may be any suitable device for powering the WTRU 2102. As examples, the power source 2134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 2118 may also be coupled to the GPS chipset 2136, which may be configured to provide location information (e.g., longitude and latitude) regarding the current location of the WTRU 2102. In addition to, or in lieu of, the information from the GPS chipset 2136, the WTRU 2102 may receive location information over the air interface 2115/2116/2117 from a base station and/or determine its location based on the timing of the signals being received from two or more nearby base stations. It will be appreciated that the WTRU 2102 may acquire location information by way of any suitable location-determination method while remaining consistent with an embodiment.

The processor 2118 may further be coupled to other peripherals 2138, which may include one or more software and/or hardware modules that provide additional features, functionality and/or wired or wireless connectivity. For example, the peripherals 2138 may include sensors such as an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 22:
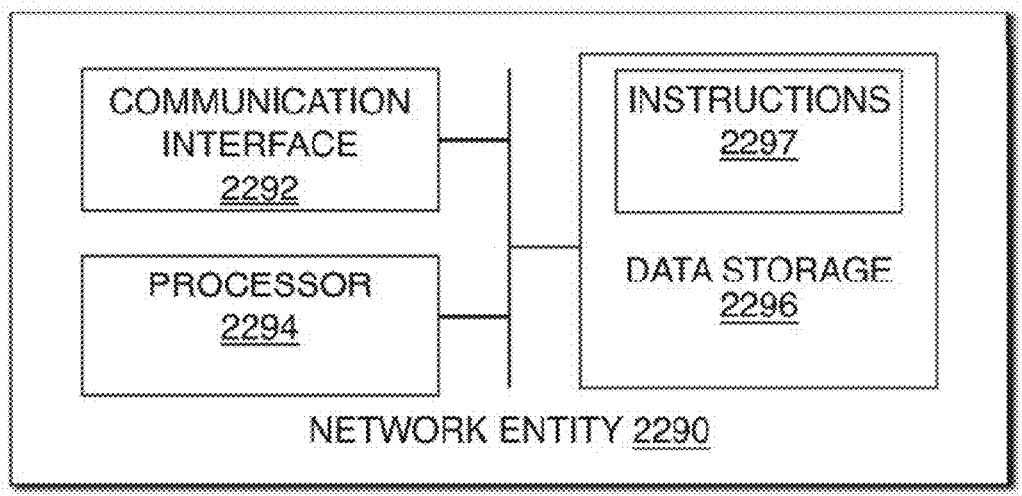
FIG. 22 illustrates an exemplary network entity that may be employed as a session control module in some embodiments.

FIG. 22 depicts an exemplary network entity 2290 that may be used in embodiments of the present disclosure, for example as a session control module or a server. As depicted in FIG. 22, network entity 2290 includes a communication interface 2292, a processor 2294, and non-transitory data storage 2296, all of which are communicatively linked by a bus, network, or other communication path 2298.

Communication interface 2292 may include one or more wired communication interfaces and/or one or more wireless-communication interfaces. With respect to wired communication, communication interface 2292 may include one or more interfaces such as Ethernet interfaces, as an example. With respect to wireless communication, communication interface 2292 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 2292 may be equipped at a scale and with a configuration appropriate for acting on the network side—as opposed to the client side—of wireless communications (e.g., LTE communications, Wi-Fi communications, and the like). Thus, communication interface 2292 may include the appropriate equipment and circuitry (perhaps including multiple transceivers) for serving multiple mobile stations, UEs, or other access terminals in a coverage area.

Processor 2294 may include one or more processors of any type deemed suitable by those of skill in the relevant art, some examples including a general-purpose microprocessor and a dedicated DSP.

Data storage 2296 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 22, data storage 2296 contains program instructions 2297 executable by processor 2294 for carrying out various combinations of the various network-entity functions described herein.

Figure 23:
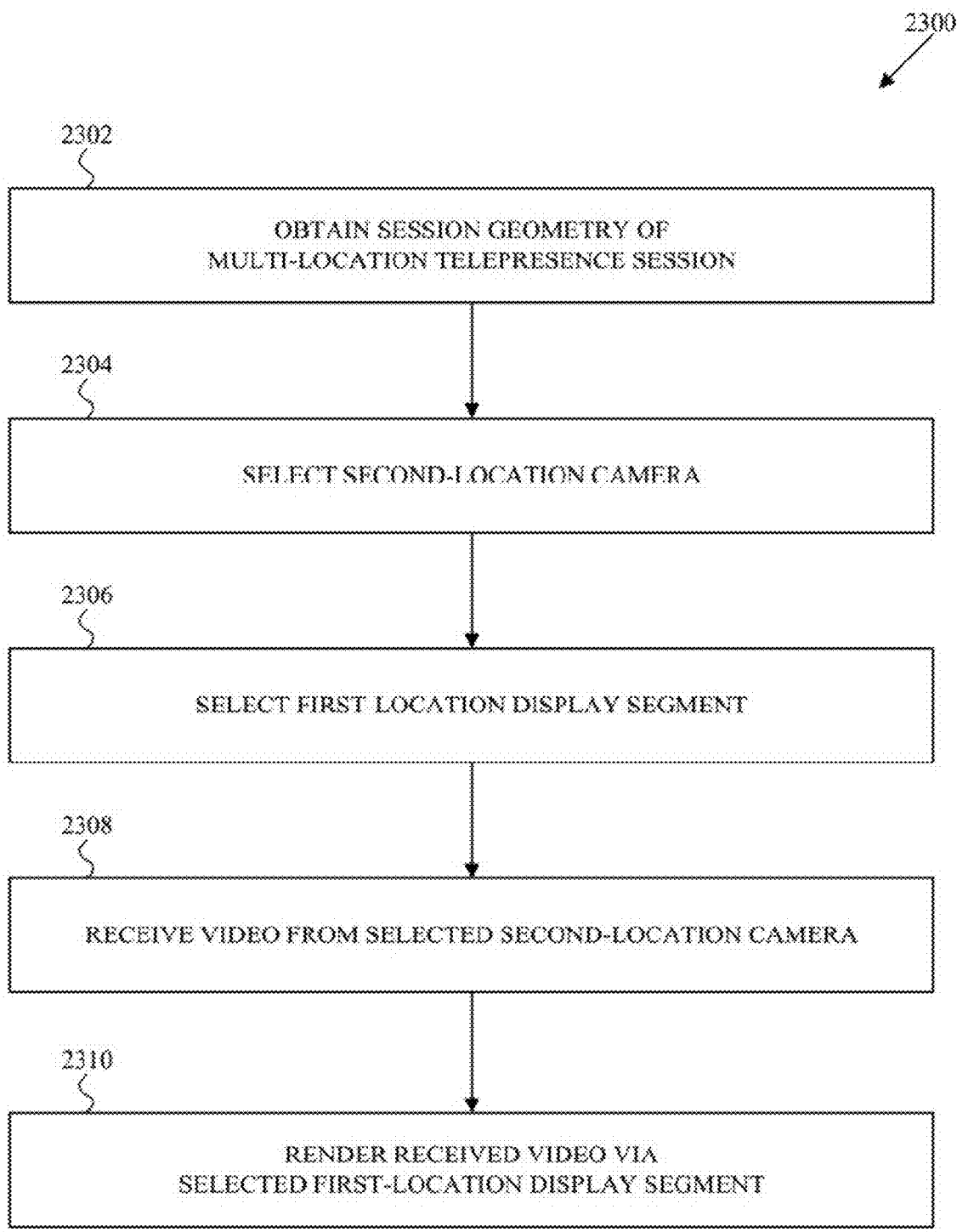
FIG. 23 is a flow chart of a method, in accordance with at least one embodiment.

FIG. 23 is a flow chart of a method, in accordance with at least one embodiment. By way of example, the method 2300 is described below as being carried out by an HMD.

At step 2302, the HMD obtains a session geometry of a multi-location telepresence session that includes a first-location participant (that is wearing the HMD in this example) at a first location and a second-location participant at a second location. The first location has a plurality of first-location cameras (e.g., mounted in a line or arc on a camera wall or the like) and a plurality of first-location display segments (which in this example are different regions of the HMD real or virtual display, but in other instances could be separate physical display devices (e.g., monitors) or separate display regions of one or more devices). The second location has a plurality of second-location cameras and a plurality of second-location display segments. In at least one embodiment, the HMD assigns at least part of the session geometry. In at least one embodiment, the HMD receives at least part of the session geometry via a data connection. One or more of the cameras could be a monoscopic camera, a stereoscopic camera, a 3D depth camera, and/or any other camera deemed suitable by those of skill in the art for a given implementation.

At step 2304, the HMD selects, according to the session geometry that was obtained at step 2302, a first-to-second-viewpoint second-location camera from the plurality of second-location cameras.

At step 2306, the HMD selects, according to the session geometry that was obtained at step 2302, a first-to-second-viewpoint first-location display segment from the plurality of first-location display segments;

At step 2308, the HMD receives a first-to-second-viewpoint video stream captured by the first-to-second-viewpoint second-location camera that was selected at step 2304.

At step 2310, the HMD generates a line-of-sight augmented-reality experience for the multi-location telepresence session at least in part by rendering the received first-to-second-viewpoint video stream via the first-to-second-viewpoint first-location display segment that was selected at step 2308. In at least one embodiment, the HMD crops the captured second-to-first-viewpoint video stream to substantially display a head (e.g., a head and shoulders) of the first participant prior to transmitting the captured second-to-first-viewpoint video stream to the second location.

In at least one embodiment, the HMD also generates a virtual meeting space that reflects the session geometry that was obtained at step 2302; in such an embodiment, rendering the received first-to-second-viewpoint video stream includes rendering the received first-to-second-viewpoint video stream as appearing in the virtual meeting space.

In at least one embodiment, the HMD also identifies, according to the session geometry that was obtained at step 2302, a first-to-second viewing orientation of the first-location participant with respect to the second-location participant; in at least one such embodiment, selecting the first-to-second-viewpoint second-location camera from the plurality of second-location cameras according to the session geometry includes determining that, among the second-location cameras in the plurality of second-location cameras, a given second-location camera most closely bears the identified first-to-second viewing orientation to the second participant; and designating the given second-location camera as being the selected first-to-second-viewpoint second-location camera; moreover, in at least one such embodiment, selecting the first-to-second-viewpoint first-location display segment from the plurality of first-location display segments according to the session geometry includes determining that, among the first-location display segments in the plurality of first-location display segments, a given first-location display segment is the one to which the first participant most closely bears the identified first-to-second-viewing orientation; and designating the given first-location display segment as being the selected first-to-second-viewpoint first-location display segment.

In at least one embodiment, the HMD also selects, according to the session geometry that was obtained at step 2302 and from the plurality of first-location cameras, a second-to-first-viewpoint first-location camera that bears substantially the same orientation to the first-location participant as the selected first-to-second-viewpoint first-location display segment bears to the first-location participant; and captures a second-to-first-viewpoint video stream of the first participant using the selected second-to-first-viewpoint first-location camera; in at least one such embodiment, wherein generating the line-of-sight augmented-reality experience for the multi-location telepresence session further includes transmitting the captured second-to-first-viewpoint video stream to the second location for rendering via a second-location display segment that bears substantially the same orientation to the second-location participant as the selected first-to-second-viewpoint second-location camera bears to the second-location participant.

In at least one embodiment, the HMD also selects, according to the session geometry that was obtained at step 2302 and from the plurality of first-location cameras, a respective other-to-first-viewpoint first-location camera for each of one or more other-location participants at respective other locations; and captures a respective other-to-first-viewpoint video stream of the first participant using each of the one or more selected other-to-first-viewpoint first-location cameras; in at least one such embodiment, generating the line-of-sight augmented-reality experience for the multi-location telepresence session further includes transmitting each respective captured other-to-first-viewpoint video stream to the corresponding other location for rendering via a respective other-location display segment that bears substantially the same orientation to the respective other-location participant as the first participant bears to the corresponding respective other-to-first-viewpoint first-location camera.

In at least one embodiment, the HMD also selects, according to the session geometry that was obtained at step 2302 and from the plurality of first-location display segments, a respective first-to-other-viewpoint first-location display segment for each other-location participant, wherein each selected first-to-other-viewpoint first-location display segment bears substantially the same orientation to the first participant as the selected other-to-first-viewpoint first-location camera associated with the same other-location participant bears to the first participant; and receives a respective first-to-other-viewpoint video stream from each other-location participant, each received first-to-other-viewpoint video stream having been captured from a first-to-other-viewpoint other-location camera that bears substantially the same orientation to the corresponding other participant as the first participant bears to the corresponding first-to-other-viewpoint first-location display segment; in at least one such embodiment, generating the line-of-sight augmented-reality experience for the multi-location telepresence session further includes rendering the corresponding received first-to-other-viewpoint video streams via the corresponding selected first-to-other-viewpoint first-location display segments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Additional Embodiments

First Additional Embodiments

An embodiment takes the form of a method that includes assigning a virtual geometry; forming a virtual meeting space by assigning a plurality of meeting sites to respective locations according to the virtual geometry, wherein each meeting site has at least one local participant; selecting, for each local participant, a set of local video feeds from a subset of cameras of a wall of cameras, and sending a respective local video feed to a respective remote participant in a remote meeting site; and receiving and displaying a set of remote video feeds, each remote video feed received from a respective remote meeting site, wherein each remote video feed is displayed in alignment with a respective camera used to capture the respective local video feed sent to the respective remote participant.

In at least one embodiment, the method also includes tracking a position of a local participant, and responsively cropping at least one of the local video feeds to include a portion of the local video feed that includes substantially the local participant's head.

In at least one embodiment, tracking is based on head-mounted cameras (HMCs) mounted on the local participant's head and fixed markers located near at least one camera of the wall of cameras.

In at least one embodiment, tracking is based on 3D depth cameras located on the wall of cameras.

In at least one embodiment, the cropping of the local video feed is based on the location of the local participant in the local video feed.

In at least one embodiment, cropping the at least one local video feed includes segmenting the local participant from a background.

In at least one embodiment, the local participant has a head-mounted display (HMD), and each remote video feed is virtually displayed over the camera representing the respective remote participant's eyes in the local space.

In at least one embodiment virtually displaying each remote video feed is determined by an orientation of the HMD.

In at least one embodiment, virtually displaying each remote video feed is determined by HMCs located on the HMD, wherein the HMCs identify markers on the wall of cameras to determine positions to display the remote video feeds.

In at least one embodiment, a number of cameras on the wall of cameras is greater than a number of remote participants, and the method further includes determining a position of the local participant; selecting a new respective local video feed from a different camera; and transmitting the new respective local video feed to the respective remote participant.

In at least one embodiment, a new respective local video feed is selected based on each local participant's position, and the new respective local video feed is transmitted to the respective remote participant.

In at least one embodiment, assigning the plurality of meeting sites further includes assigning respective remote participant locations.

In at least one embodiment, the respective remote participant locations are based on physical locations between at least two remote participants in a common meeting site.

In at least one embodiment, the background is a solid color.

In at least one embodiment, each local feed for each local participant is a stereoscopic 3D feed based on two neighboring cameras on the wall of cameras and a natural focal point representing a position of the local participant associated with the local feed.

In at least one embodiment, a virtual object is displayed virtually. In at least one embodiment, the virtual object is a virtual meeting table.

In at least one embodiment, the markers are located in a predefined relationship to the cameras of the wall of cameras.

In at least one embodiment, the cameras on the wall of cameras are in a straight line.

In at least one embodiment, the cameras on the wall of cameras are in an arc.

In at least one embodiment, the cameras on the wall of cameras are oriented in straight lines, the straight lines at various angles to each other.

In at least one embodiment, each local video feed for each local participant is captured using a 2-dimensional array of cameras on the wall of cameras.

In at least one embodiment, the method also includes observing the virtual meeting space from a perspective of a remote participant.

In at least one embodiment, each remote video feed is displayed within a virtual reality meeting space.

In at least one embodiment, each remote video feed is displayed as a video captured by a remote camera.

In at least one embodiment, each remote video feed is displayed as a 3d avatar based on information captured by at least one remote camera.

In at least one embodiment, at least some of the information captured by the at least one remote camera is gestures used to animate the 3-dimensional avatar.

In at least one embodiment, the animations comprise facial expressions.

In at least one embodiment, a local meeting site has multiple local participants, and for each local participant, the virtual reality meeting space displays the other local participants.

In at least one embodiment, a relative position of local participants is preserved.

In at least one embodiment, the remote video feeds are displayed on a plurality of displays.

In at least one embodiment, the displays are multi-view displays, and different remote video feeds for different local participants are displayed on a single display.

In at least one embodiment, each remote video feed displayed is determined by a position of a respective local participant.

In at least one embodiment, the position is determined by cameras on the wall of cameras.

In at least one embodiment, the position is determined by sensors on the wall of cameras.

In at least one embodiment, the plurality of displays are arranged in a multi-screen mosaic.

In at least one embodiment, each remote participant is shown in a 3D modeled virtual reality space on at least one of the plurality of displays.

In at least one embodiment, each remote video feed is cropped to show a head region of the remote participant.

In at least one embodiment, a background of each remote video feed is removed using chroma-key techniques.

In at least one embodiment, the removed background is replaced with the 3-dimensional modeled virtual reality space.

In at least one embodiment, the remote video feeds represent 3D reconstructions based on a 3D model of a remote meeting site captured by an array of 3D depth sensors.

In at least one embodiment, the remote video feeds are displayed using an HMD in augmented reality.

In at least one embodiment, the remote video feeds are displayed using an HMD in a virtual reality space.

In at least one embodiment, the remote video feeds are displayed on multi-view displays.

In at least one embodiment, the remote video feeds also comprises video data captured from a video camera on the wall of cameras.

In at least one embodiment, a remote video feed from a first remote meeting site includes video data captured from video cameras, and a remote video feed from a second remote meeting site represents the 3D reconstruction.

Second Additional Embodiments

An embodiment takes the form of a method that includes defining a virtual geometry based on a number of meeting sites, each meeting site having a number of participants; capturing, for each participant in each meeting site, a local 3D video feed using a subset of cameras/3D sensors, and locally generating a 3D reconstruction of the local 3D video feed; receiving, from each remote participant, position information, and responsively generating a unique 3D perspective based on the position information, wherein each unique 3D perspective includes a portion of a total amount of data contained within the 3D reconstruction; transmitting the unique 3D perspectives to each remote participant; and receiving, from each remote participant, a remote 3D perspective and displaying each remote 3D perspective in alignment with a camera/3D sensor associated with the remote participant associated with the remote 3D perspective.

In at least one embodiment, each unique 3D perspective is further based on remote participant input.

In at least one embodiment, remote participant input for a first remote participant affects the unique 3D perspective sent to a second remote participant.

Third Additional Embodiments

An embodiment takes the form of a method that includes defining a virtual geometry based on a number of meeting sites, each meeting site comprising a number of participants; for each participant in each meeting site, capturing sensor data corresponding to a local scene using an arrangement of sensors; generating a reconstructed 3D scene based on the sensor data; capturing a projection of the reconstructed 3D scene from a plurality of remote directions; forming perspective videos based on the projections from the plurality of remote directions, each perspective videos corresponding to a portion of the projection; sending each perspective video to a respective remote user within a respective remote site; receiving a remote perspective video from each remote site, the received remote perspective video based on local directions; and rendering each received remote perspective video to each local users direction.

In at least one embodiment, the plurality of remote directions corresponds to remote user position information.

In at least one embodiment, the plurality of remote directions corresponds to remote user input.

In at least one embodiment, the plurality of remote directions corresponds to a combination of user position information and remote user input.

In at least one embodiment, the virtual geometry is constantly updated.

In at least one embodiment, the virtual geometry is updated in response to a user request.

Fourth Additional Embodiments

An embodiment takes the form of a method for defining a virtual geometry, where the method includes registering all meeting sites and users within each meeting site; receiving position information regarding each user; generating a common virtual geometry between each meeting site and all users within the meeting sites; forming connections between users in differing meeting sites; and forming and dispatching data between users in different meeting sites.

In at least one embodiment, position information corresponds to position of a user in a respective meeting site.

In at least one embodiment, the data includes video data.

In at least one embodiment, the data includes audio data.

In at least one embodiment, the data includes position data.

In at least one embodiment, the data includes 3D perspectives of a 3D reconstructed scene.

Fifth Additional Embodiments

An embodiment takes the form of an apparatus that includes a session control module configured to assign a virtual geometry and form a virtual meeting space by assigning a plurality of meeting sites to respective locations according to the virtual geometry, wherein each meeting site has at least one local participant; a subset of a plurality of cameras configured to capture a set of local video feeds, each local video feed captured from a respective camera of the subset, and send a respective local video feed to a respective remote participant in a different/remote meeting site; and a plurality of displays configured to receive and display a set of remote video feeds, each remote video feed received from a respective remote participant/meeting site, wherein each remote video feed is displayed in alignment with a respective camera used to capture the respective local video feed sent to the respective remote participant.

Sixth Additional Embodiments

An embodiment takes the form of an apparatus that includes a plurality of cameras/3D sensors configured to capture sensor data corresponding to a local scene, generate a reconstructed 3D scene based on the sensor data, capture a projection of the reconstructed 3D scene from a plurality of remote directions, and form perspective videos based on the projections from the plurality of remote directions, each perspective videos corresponding to a portion of the projection; a session control module configured to define a virtual geometry based on a number of meeting sites, each meeting site comprising a number of participants, send each perspective video to a respective remote user within a respective remote site and receive a remote perspective video from each remote site, the received remote perspective video based on local directions; and a display module configured to render each received remote perspective video to each local users direction.

Seventh Additional Embodiments

An embodiment takes the form of a method that includes determining a location of at least a first user in a first meeting space, the first meeting space having a first linear array of cameras; determining a location of at least a second user in a second meeting space, the second meeting space having a second linear array of cameras; defining a virtual meeting geometry including virtual locations of at least the first and second user in the virtual meeting geometry; based on the virtual locations of the first and second users, selecting at least one selected camera for each of the first and second users; displaying to the first user a view of the second user taken by the selected camera associated with the first user; and displaying to the second user a view of the first user taken by the selected camera associated with the second user.

In at least one embodiment, the displaying to the first user is performed by an augmented reality headset worn by the first user.

In at least one embodiment, determining the location of the first user is performed using the augmented reality headset of the first user.

Eighth Additional Embodiments

An embodiment takes the form of a method that includes determining physical locations of a plurality of meeting participants, including at least a first participant in a first meeting location and a second participant in a second meeting location; based on the physical locations, assigning each participant to a virtual location in a virtual meeting geometry; based on the virtual location of the first participant and the second participant, selecting at least one first selected camera to provide an image of the second participant to the first participant; and displaying the image of the second participant to the first participant.

In at least one embodiment, the image of the second participant is displayed by an augmented reality headset of the first participant.

In at least one embodiment, the physical location of the first participant is determined using the augmented reality headset.

In at least one embodiment, the method also includes selecting, based on the virtual location of the first participant and the second participant, at least one second selected camera to provide an image of the first participant to the second participant; and displaying the image of the first participant to the second participant.

In at least one embodiment, the image of the first participant is displayed in substantial alignment with the second selected camera, and wherein the image of the second participant is displayed in substantial alignment with the first selected camera.

Ninth Additional Embodiments

An embodiment takes the form of a method for determination of a multi-party, multi-location telepresence session geometry for use in generating a line-of-sight augmented reality view for a first user at a first location of a second user at a second location, where the method includes detecting a viewing orientation of a first user at a first location with respect to a representation of a second user at a second location being rendered to the first user using an augmented reality device; determining which of a plurality of cameras at the second location is capturing a field of view including the second user at an orientation matching the viewing orientation of the first user with respect to the rendered representation of the second user; and generating the rendered representation of the second user to be presented to the first user using an augmented reality device based at least in part on imagery captured by the determined camera.

In at least one embodiment, each camera of the plurality of cameras is a monoscopic camera.

In at least one embodiment, each camera of the plurality of cameras is a stereoscopic camera.

In at least one embodiment, each camera of the plurality of cameras provides the data to create a 3D reconstructed model of the conferencing session at each site to then product a virtual camera video stream from the particular position best matching the viewing orientation of the remote session participants.

In at least one embodiment, each camera of the plurality of cameras includes a depth camera.

Tenth Additional Embodiments

An embodiment takes the form of a method for use in generating a near line-of-sight augmented reality view for a first user at a first location of a second user at a second location, where the method includes detecting a viewing orientation of a first user at a first location with respect to a representation of a second user at a second location being rendered to the first user using an augmented reality display; determining which of a plurality of cameras at the second location is capturing a field of view including the second user at an orientation most closely matching the viewing orientation of the first user with respect to the rendered representation of the second user; and generating the rendered representation of the second user to be presented to the first user using the augmented reality display based at least in part on imagery captured by the determined camera.

In at least one embodiment, each camera of the plurality of cameras is a monoscopic camera.

In at least one embodiment, each camera of the plurality of cameras is a stereoscopic camera.

In at least one embodiment, each camera of the plurality of cameras provides the data to create a 3D reconstructed model of the conferencing session at each site to then product a virtual camera video stream from the particular position best matching the viewing orientation of the remote session participants.

In at least one embodiment, each camera of the plurality of cameras includes a depth camera.

What is claimed:
1. A method comprising:
in a multi-location telepresence session that includes a first participant at a first physical location and a second participant at a second physical location, the first physical location having an array of cameras and an augmented reality (AR) marker located in a predefined relationship to the array of cameras, capturing an image of the AR marker using a head mounted camera of the first participant;

analyzing the captured image to determine first location information associated with the first participant;
receiving second location information associated with the second participant;
selecting, based on the first location information and the second-location information, a camera from the array of cameras to provide a line-of-sight video view of the first participant to display to the second participant; and
transmitting a first video stream, the first video stream comprising the line-of-sight video view of the first participant captured by the camera selected.

2. The method of claim 1, further comprising:
receiving a second video stream, the second video stream comprising a line-of-sight video view of the second participant to display to the first participant; and
displaying the second video stream in an AR display device of the first participant.

3. The method of claim 2, wherein the second video stream is displayed in the AR display device of the first user at a position based on the first location information and the second location information.

4. The method of claim 2, wherein the second video stream is displayed in the AR display device of the first user in alignment with the location of the selected camera from the array of cameras.

5. The method of claim 1, further comprising:
determining from the first location information and the second location information corresponding locations in a virtual session geometry,
wherein selecting the camera from the array of cameras is further based on the determined locations in the virtual session geometry.

6. The method of claim 1, further comprising cropping video content from the selected camera to produce the first video stream.

7. The method of claim 1, wherein the array of cameras is a 1-D camera array.

8. The method of claim 1, wherein the array of cameras is selected from the group consisting of a 2-D camera array and a 3-D camera array.

9. The method of claim 1, wherein the array of cameras is a device comprising a plurality of cameras and the AR marker.

10. The method of claim 1, further comprising transmitting an identifier of the first user and the first location information associated with the first user.

11. The method of claim 1, further comprising:
transmitting a viewpoint of the first user, the viewpoint specifying a desired viewing position of the first user, the desired viewing position differing from the physical viewing position of the first user at the first physical location; and
receiving a second video stream, the second video stream comprising a video view of the second physical location based on the transmitted viewpoint.

12. An apparatus comprising:
a processor; and
a non-transitory computer-readable medium storing instructions operative, when executed by the processor, to cause the apparatus to:
in a multi-location telepresence session that includes a first participant at a first physical location and a second participant at a second physical location, the first physical location having an array of cameras and an augmented reality (AR) marker located in a predefined relationship to the array of cameras, capture an image of the AR marker using a head mounted camera of the first-location participant;
analyze the captured image to determine first location information associated with the first participant;
receive second location information associated with the second participant;
selecting, based on the first location information and the second-location information, a camera from the array of cameras to provide a line-of-sight video view of the first participant to display to the second participant; and
transmit a first video stream, the first video stream comprising the line-of-sight video view of the first participant captured by the camera selected.

13. The apparatus of claim 12, wherein the instructions, when executed by the processor, are further operative to:
receive a second video stream, the second video stream comprising a line-of-sight video view of the second participant suitable for display to the first participant; and
display the second video stream in an AR display device of the first participant.

14. The apparatus of claim 13,
wherein the instructions, when executed by the processor, are further operative to display the second video stream in an AR display device of the first participant comprise instructions to display the second video stream at a position based on the first location information and the second location information.

15. The apparatus of claim 13,
wherein the instructions, when executed by the processor, are further operative to display the second video stream in an AR display device of the first participant comprise instructions to display the second video stream in alignment with the location of the selected camera from the array of cameras.

16. The apparatus of claim 12,
wherein the instructions, when executed by the processor, are further operative to determine from the first location information and the second location information corresponding locations in a virtual session geometry, and
wherein selecting the camera from the array of cameras is further based on the determined locations in the virtual session geometry.

17. The apparatus of claim 12, wherein the instructions, when executed by the processor, are further operative to crop video content from the selected camera to produce the first video stream.

18. The apparatus of claim 12, wherein the array of cameras is a device comprising a plurality of cameras and the AR marker.

19. The apparatus of claim 12, wherein the instructions, when executed by the processor, are further operative to:
transmit a viewpoint of the first user, the viewpoint specifying a desired viewing position of the first user, the desired viewing position differing from the physical viewing position of the first user at the first physical location; and
receive a second video stream, the second video stream comprising a video view of the second physical location based on the transmitted viewpoint.

20. A system comprising:
a camera array device comprising a plurality of cameras and an augmented reality (AR) marker;
an AR display device of a user, the AR display device comprising a camera;
a processor; and a non-transitory computer-readable medium storing instructions operative, when executed by the processor, to cause the system to:
  analyze an image captured from the camera of the AR display to determine location information associated with the user, the location information based on the position of the AR marker in the captured image;
  select, based on the location information, a camera from the array of cameras to provide a line-of-sight video view of the first user to display to a second user; and
transmit a first video stream, the first video stream comprising the line-of-sight video of the first user captured by the selected camera.

* * * * *